(12) United States Patent
Bajorins et al.

(10) Patent No.: US 10,394,038 B2
(45) Date of Patent: Aug. 27, 2019

(54) IMAGE DIVERSION TO CAPTURE IMAGES ON A PORTABLE ELECTRONIC DEVICE

(71) Applicant: iOculi, Inc., Renton, WA (US)

(72) Inventors: David Bajorins, Bothell, WA (US); Jonathan D. Cowles, Renton, WA (US); John Bruce Forbes, Seattle, WA (US)

(73) Assignee: iOculi, Inc., Renton, WA (US)

( * ) Notice: Subject to any disclaimer, the term of this patent is extended or adjusted under 35 U.S.C. 154(b) by 62 days.

(21) Appl. No.: 15/507,162

(22) PCT Filed: Aug. 28, 2015

(86) PCT No.: PCT/US2015/047416
§ 371 (c)(1),
(2) Date: Feb. 27, 2017

(87) PCT Pub. No.: WO2016/033452
PCT Pub. Date: Mar. 3, 2016

(65) Prior Publication Data
US 2017/0276954 A1 Sep. 28, 2017

Related U.S. Application Data

(60) Provisional application No. 62/044,975, filed on Sep. 2, 2014, provisional application No. 62/044,187, filed on Aug. 29, 2014.

(51) Int. Cl.
*G02B 27/01* (2006.01)
*G02B 27/14* (2006.01)
(Continued)

(52) U.S. Cl.
CPC ....... *G02B 27/2235* (2013.01); *G02B 27/149* (2013.01); *G03B 35/10* (2013.01);
(Continued)

(58) Field of Classification Search
CPC .. G02B 27/2235; H04N 5/2259; G03B 35/10; G03B 37/00
(Continued)

(56) References Cited

U.S. PATENT DOCUMENTS

| 7,256,895 B2 * | 8/2007 | Castonguay | G01N 21/474 356/446 |
| 7,643,749 B2 * | 1/2010 | Shyu | G03B 17/245 396/332 |

(Continued)

FOREIGN PATENT DOCUMENTS

| WO | WO-2014017409 A1 * | 1/2014 | ........ H04N 5/3572 |
| WO | 2014/066405 | 5/2014 | |
| WO | 2014/087396 | 6/2014 | |

OTHER PUBLICATIONS

International Search Report and Written Opinion of the International Searching Authority dated Dec. 11, 2015, in International Patent Application No. PCT/US2015/047416, 12 pages.

*Primary Examiner* — Jade R Chwasz
(74) *Attorney, Agent, or Firm* — Ellen M. Bierman; Lowe Graham Jones PLLC

(57) ABSTRACT

Technologies are generally described for optical image diversion to provide image capture and display from one or more directions using an image sensor. In some examples, an optical assembly may be used to receive light or other electromagnetic radiation from multiple (including opposing) directions and to provide light or other electromagnetic radiation to an image sensor or detector to capture images. The optical assembly may be centrally-aligned or offset. The optical assembly may be configured to allow collection of light or other electromagnetic radiation from two or more locations. An auto focus or stabilization element may be integrated into one or more optical paths inside an optical switching device. In other examples, a conical or spherical (Continued)

element may be employed to allow capture of panoramic/360 degree images or video. Elements may also be stacked. Furthermore, the optical assembly may be configured to split an optical beam to allow tiling or superimposition of images from different directions at the image sensor.

24 Claims, 27 Drawing Sheets

(51) Int. Cl.
G02B 27/22 (2018.01)
G03B 35/10 (2006.01)
G03B 37/00 (2006.01)
H04N 5/225 (2006.01)

(52) U.S. Cl.
CPC ........... *G03B 37/00* (2013.01); *H04N 5/2259* (2013.01); *G02B 27/017* (2013.01); *G02B 2027/0138* (2013.01)

(58) Field of Classification Search
USPC ................ 359/462, 464, 466, 475, 477, 471
See application file for complete search history.

(56) References Cited

U.S. PATENT DOCUMENTS

| | | |
|---|---|---|
| 2005/0168616 A1 | 8/2005 | Rastegar et al. |
| 2007/0086762 A1 | 4/2007 | O'Keefe et al. |
| 2010/0321471 A1 | 12/2010 | Casolara |
| 2011/0109971 A1 | 5/2011 | Beach et al. |
| 2012/0002096 A1* | 1/2012 | Choi .................... H04N 5/2253 348/335 |
| 2012/0287333 A1* | 11/2012 | Huang .................. G03B 17/17 348/369 |
| 2013/0342660 A1* | 12/2013 | Iwasaki ................ H04N 13/239 348/47 |
| 2014/0192214 A1* | 7/2014 | Laroia .................... G06T 11/60 348/218.1 |

* cited by examiner

COMPUTER PROGRAM PRODUCT 1000

SIGNAL-BEARING MEDIUM 1002

1004 ONE OR MORE INSTRUCTIONS TO

SELECT A FIRST OPTICAL MODULE AND/OR A SECOND OPTICAL MODULE TO CAPTURE A FIRST IMAGE AND/OR A SECOND IMAGE AT AN IMAGE SENSOR OF THE PORTABLE ELECTRONIC DEVICE;
DIRECT RECEIVED LIGHT FROM THE FIRST OPTICAL MODULE AND/OR THE SECOND OPTICAL MODULE TO THE IMAGE SENSOR THROUGH AN OPTICAL SWITCHING INTERFACE AND A REFLECTIVE ELEMENT; AND
CAPTURE THE FIRST IMAGE AND/OR THE SECOND IMAGE AT THE IMAGE SENSOR OF THE PORTABLE ELECTRONIC DEVICE.

| COMPUTER-READABLE MEDIUM 1006 | RECORDABLE MEDIUM 1008 | COMMUNICATIONS MEDIUM 1010 |

FIG. 10

IMAGE DIVERSION TO CAPTURE IMAGES ON A PORTABLE ELECTRONIC DEVICE

CROSS REFERENCE TO RELATED APPLICATIONS

This application is a U.S. national phase of International Application No. PCT/US2015/047416 filed on Aug. 28, 2015; which claims priority from U.S. Provisional Application No. 62/044,187 filed on Aug. 29, 2014 and U.S. Provisional Application No. 62/044,975 filed on Sep. 2, 2014, which applications are hereby incorporated by reference in their entireties.

BACKGROUND

Unless otherwise indicated herein, the materials described in this section are not prior art to the claims in this application and are not admitted to be prior art by inclusion in this section.

With the advancement of technology and expansion of the consumer electronics industry, an increasing variety of functionality is expected in electronic devices such as tablets and smartphones. Image and video capture is one of the most important types of functionality. For instance, having both front and rear facing cameras is now required to be competitive in the smartphone marketplace.

The implementation of multiple cameras is also a differentiating factor in sports and action cameras, body cameras for law enforcement, security cameras, medical devices, agricultural monitoring systems, drone cameras, and devices for capturing virtual reality content.

However, multiple image or video capture subsystems typically not only add to the complexity and cost of electronic devices, but also result in design challenges considering the advantages of a small form factor, especially thickness, of such devices which may be a major design consideration.

In addition, current multiple camera implementations often contain redundancies which add considerably to manufacturing costs, shorten battery life, add weight, and create additional complexity in both hardware and software systems.

SUMMARY

The present disclosure generally describes devices and techniques related to the diversion of images or other forms of electromagnetic radiation on a portable electronic device.

According to some examples, an electronic device configured to capture images from different directions is described. An example electronic device may include an image sensor and an image diversion sub-system, which may include a first optical module, the first optical module configured to allow the image sensor to capture a first image from a first direction; a second optical module, the second optical module configured to allow the image sensor to capture a second image from a second direction; and an optical switching interface configured to optically couple one or both of the first optical module and the second optical module to the image sensor.

According to other examples, a smart phone capable of capturing images from different directions is described. The smart phone may include a housing; at least one communication sub-system within the housing; at least one processing sub-system within the housing; at least one camera within the housing, the at least one camera coupled to the at least one processing sub-system; and at least one image diversion sub-system within the housing, the at least one image diversion sub-system coupled to the at least one camera. The at least one image diversion sub-system may include a first optical module comprising a first plurality of optical elements, the first optical module configured to allow the at least one camera to capture a first image from a rear direction of the smart phone; a second optical module comprising a second plurality of optical elements, the second optical module configured to allow the at least one camera to capture a second image from a front direction of the smart phone; and at least one optical switching interface configured to optically couple the first optical module and the second optical module to the at least one camera.

According to further examples, a method to use an image diversion system within an electronic device is described. The method may include selecting one of a first optical module and a second optical module to capture one of a first image and a second image at an image sensor of the electronic device, where the first optical module may be configured to allow the image sensor to capture the first image from a first direction, the second optical module may be configured to allow the image sensor to capture the second image from a second direction, and an optical switching interface configured to optically couple one or both of the first optical module and the second optical module to the image sensor; and capturing the one of the first image and the second image at the image sensor of the electronic device.

According to yet other examples, method to assemble an image diversion system, the method may include coupling a first optical module to an optical switching interface, where the first optical module may include a first plurality of optical elements and may be configured to allow an image sensor to capture a first image from a first direction; coupling a second optical module to the optical switching interface, where the second optical module may include a second plurality of optical elements and may be configured to allow the image sensor to capture a second image from a second direction; and where the first plurality of optical elements may include a first series of aligned lenses, polarizers, optical filters, or partial reflectors and the second plurality of optical elements may include a second series of aligned lenses, polarizers, optical filters, or partial reflectors, and the first series and the second series may include a similar arrangement of optical elements.

According to some examples, an image diversion system is described. An example system may include a first optical module comprising a first plurality of optical elements, the first optical module configured to allow at least one image sensor to capture a first image from a first direction; a second optical module comprising a second plurality of optical elements, the second optical module configured to allow the at least one image sensor to capture a second image from a second direction; and at least one optical switching interface configured to optically couple one or both of the first optical module and the second optical module to the at least one image sensor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 illustrates a block diagram of an example computer program product, all arranged in accordance with at least some embodiments described herein.

DETAILED DESCRIPTION

Figure 1A:
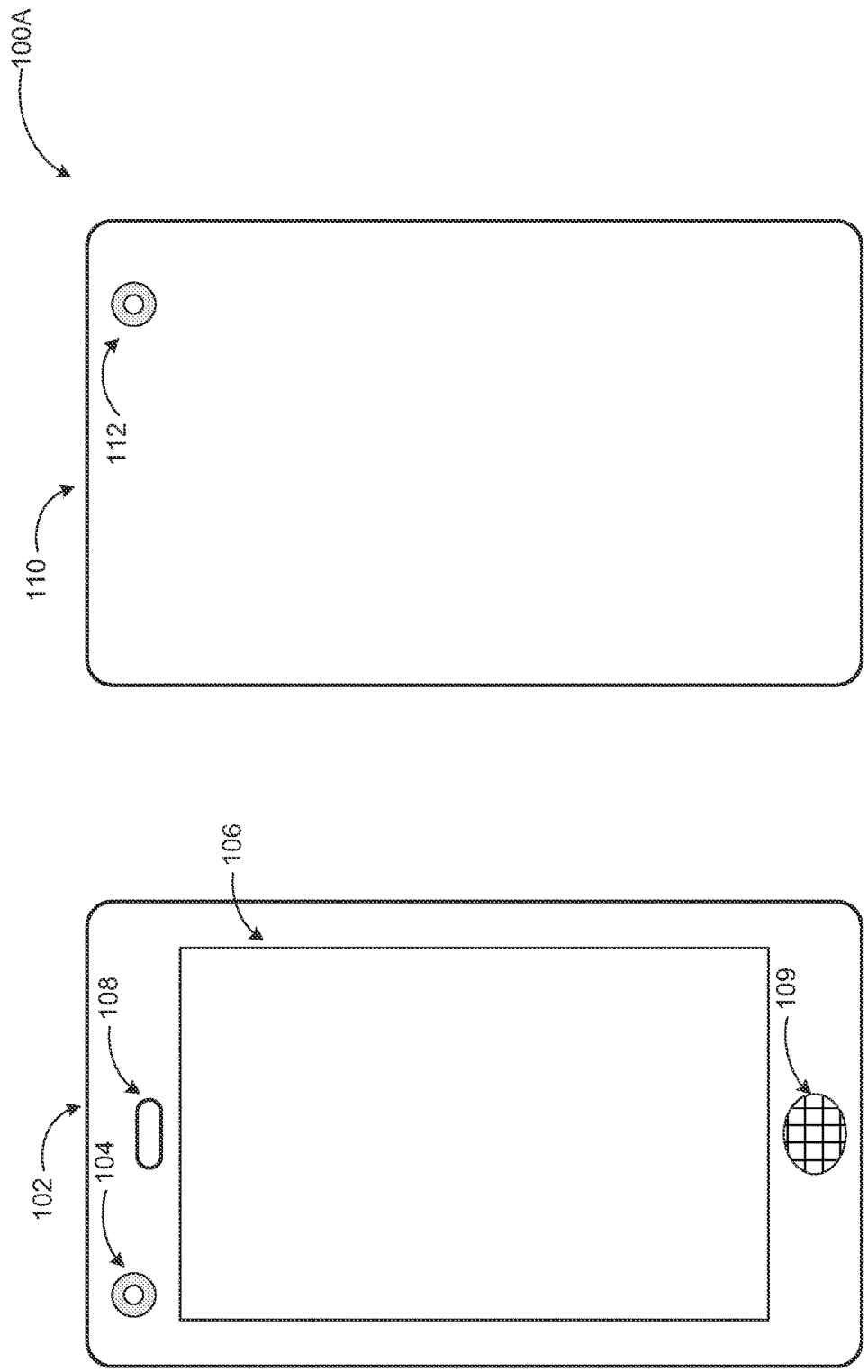
FIG. 1A through 1D illustrate example portable devices that may be used to house an image diversion system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to the diversion of images or other forms of electromagnetic radiation on a portable electronic device.

Briefly stated, technologies are generally described for optical image diversion to provide image capture and display from one or more directions using a single image sensor. In some examples, an optical assembly may be used to receive light from multiple (including opposing) directions and to provide the light to an image sensor to capture images. The optical assembly may be centrally-aligned or offset. The optical assembly may be configured to allow collection of light from two or more locations on the underlying device. An autofocus or stabilization element, or both an autofocus and a stabilization element may be integrated into one or more optical paths inside an optical switching device. In other examples, a conical, spherical element, or polyhedral element may be employed to allow capture of panoramic/360 degree images or video. Elements may also be stacked. Furthermore, the optical assembly may be configured to split an optical beam to allow tiling or superimposition of images from different directions at the image sensor. While images may often be visible light images, images may alternatively include other wavelengths or wavelength ranges of light such as infrared light or ultraviolet light, as well as other information such as time of flight data. Combinations of types of light may also be captured, such as visible light and infrared light, visible light and ultraviolet light, or infrared light and ultraviolet light.

An image diversion system may be used in conjunction with image capture systems in a variety of devices including, but not limited to, cellular phones, smart phones, tablets, laptops, head mounted displays, watches, wearable electronics, personal digital assistants (PDAs), game devices, messaging devices, media players, pagers, or any other suitable mobile device with image capture capability. Broadly, an image capture system may be any device that can sense and capture electromagnetic radiation that has traveled through an object, or reflected from an object to create an image of the object. Images may be 2D or 3D. Examples of images include, but are not limited to, analog images, digital images, movies, videos, ultrasound images, x-ray images, thermal images, infrared images, ultra-violet images, and visible images providing depth or topological information, or any combinations thereof. An image diversion system may further be used in conjunction with digital cameras, video cameras, conventional film cameras, sports cameras, body cameras, drone cameras, virtual reality cameras, wearable devices, security systems, monitoring devices, medical devices, and similar devices. Furthermore, the image diversion system may also be used in conjunction with image capture systems on stationary devices, for example, a webcam on a desktop computer may be fitted with a mountable version (as opposed to integrated) of the image diversion system to provide front-and-back image capture.

In addition to or in conjunction with the above-listed example implementations, an image diversion system according to embodiments may be used in dual (for example, front and back) view capture, quad (for example, front, back, left, right) view capture, 360 degree (N views in a circular planar array) view capture, dome (N views in a half sphere) view capture, and spherical view capture (N views in all directions). The views may be regularly or irregularly distributed along a given axis, as well as rotated into any arbitrary position or angle. For example, the quad view may be spun so each camera is offset at a 45-degree angle—front left, front right, back left, and back right.

Example embodiments of a system using a reflector such as an electro-optical field of view multiplexer as described herein may be implemented using electro-chromic materials and/or electronic switching. The term "electro-optical field of view multiplexer" is used herein to refer to a mono or polychromatic field of view multiplexer that is configured to redirect electromagnetic radiation including but not limited to visible light comprising the field of view or optical paths presented to an image sensor or other such detector of an imaging or non-imaging optical system. Electromagnetic radiation may include, for example, gamma rays, x-rays, long wavelength radio waves, infrared (IR) light spectrum, ultraviolet (UV) light spectrum, near IR light spectrum, near UV light spectrum, and/or near visible light spectrum. In some embodiments, an optical module may include an aperture window and an electro-optical field of view multiplexer. In other cases, the optical module may include the electro-optical field of view multiplexer and a plurality of optical elements. The electro-optical field of view multiplexer module may provide enhanced stability through the lack of moving parts in it. In-line lens elements as described herein may be used to provide in-line autofocus, image stabilization, or both autofocus and image stabilization. Moreover, one or more shutters as discussed herein may be used to reduce light infiltration. Previous approaches used coated prisms, which may reflect 50% of light that enters the apparatus. This is not sufficient for modern imaging systems. Embodiments described herein can be configured to reflect up to 95% of light, making implementations usable for consumer and commercial applications. Embodiments described herein may allow for offset apertures and for redirecting light 180 degrees to allow image sensors to be placed in thin housings offset from and perpendicular to one or more apertures.

Thus, a system according to embodiments may support the various configurations described herein, allow rotation and concentration of image sensors such as cameras in any direction, use a reduced number of image sensors (as little as one), and use a reduced number of optical components.

The system according to the embodiments may further allow the relocation of many optical elements (for example, lenses, filters, autofocus, stabilization components) to after the image diversion subsystem and before the image sensor (for example, a camera). This may eliminate the necessity of duplicating these components, which conventional systems have, dramatically lowering manufacturing costs. For instance, instead of having two separate autofocus systems for the front and back cameras, the system according to the embodiments may place a single autofocus element in the optical switching device and before the image sensor, resulting in a savings of one element. In some examples, a detector may be used in place of an image sensor. A detector may comprise a photometer, photomultiplier, time-of-flight detector, and so on. The detector may be an optical detector, such as a visible light detector, a near-IR detector, a UV detector, or a detector sensitive to a range of electromagnetic wavelengths mentioned herein including visible, near-IR, and/or near-UV radiation.

While example systems and components are described with reference to images (for example, an image sensor, an image diversion module, and so on), embodiments are not limited to systems to capture images only. Some embodiments may be implemented in non-imaging applications. For example, time of flight (the time it takes for an electromagnetic or other wave to travel a distance through a particular medium) may be captured with a system according to embodiments. Thus, components such as image diversion subsystem/module/element and image sensors/detectors may be implemented to divert/capture/process entities other than images within a field of view of the system.

FIG. 1A through 1D illustrate example portable devices that may be used to house an image diversion system, arranged in accordance with at least some embodiments described herein.

Diagram 100A shows front view 102 and rear view 110 of a smart phone. For simplicity purposes, display 106, speaker 108, and microphone 109 are shown as components of the smart phone on the front view 102. The smart phone also includes a camera aperture 104 in the front view 102 and another camera aperture 112 in the rear view 110. Conventional smart phones typically include two distinct cameras coupled to the camera apertures 104 and 112 adding to the cost and complexity of the device. A smart phone with an image diversion system according to embodiments may include a single camera that is optically coupled to both camera apertures 104 and 110.

Figure 1B:
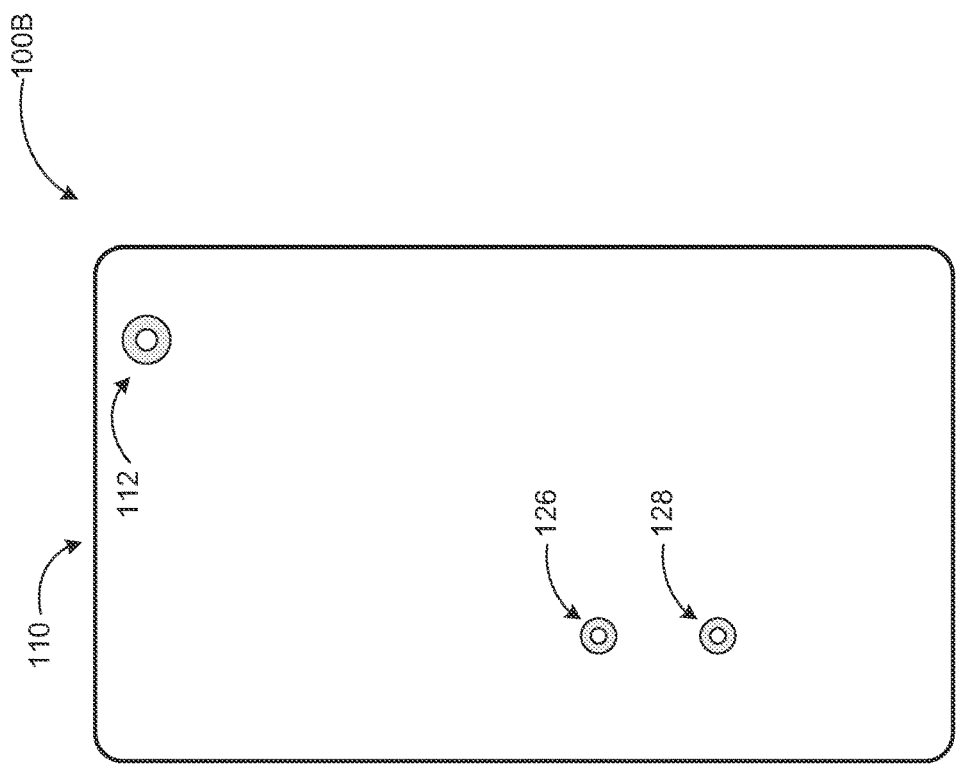
Figure 1B:
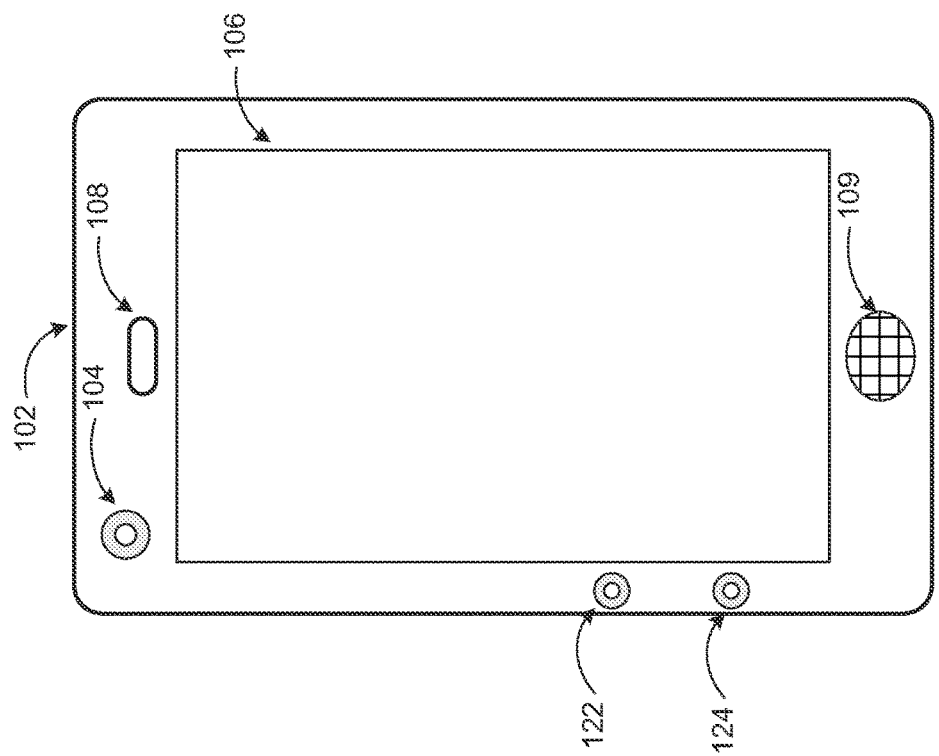
Figure 1C:
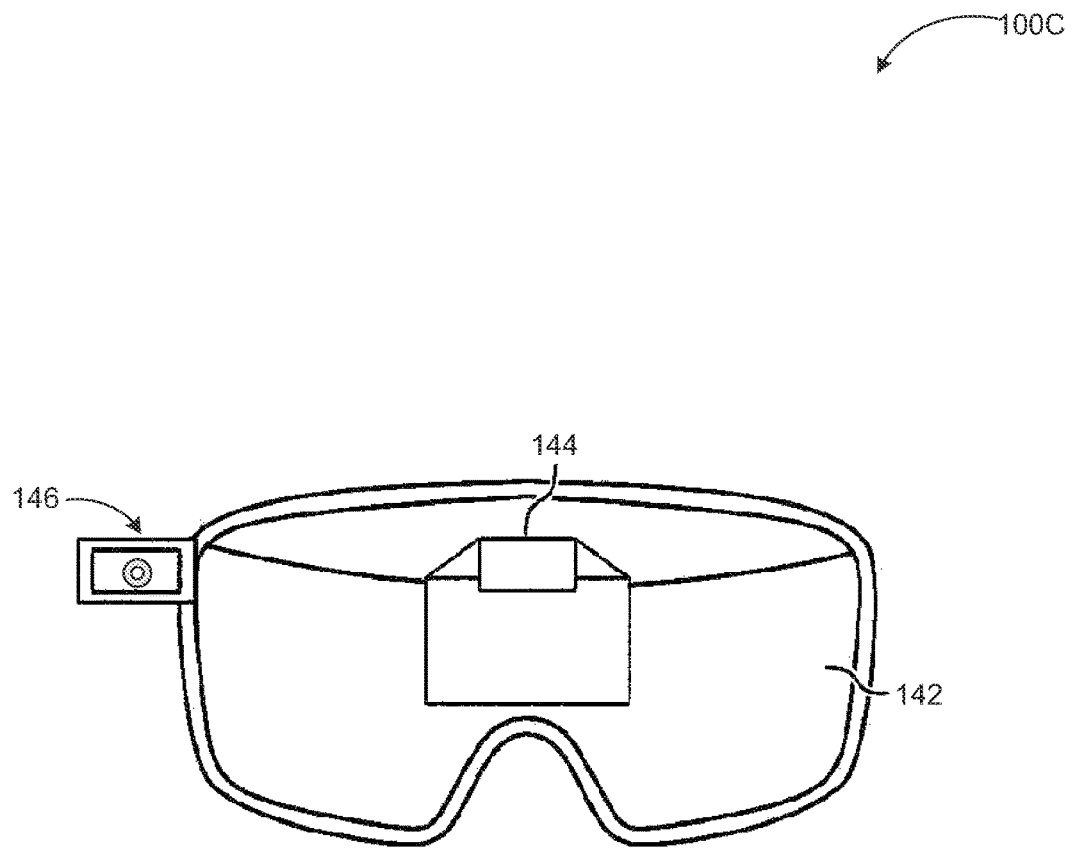
Figure 1D:
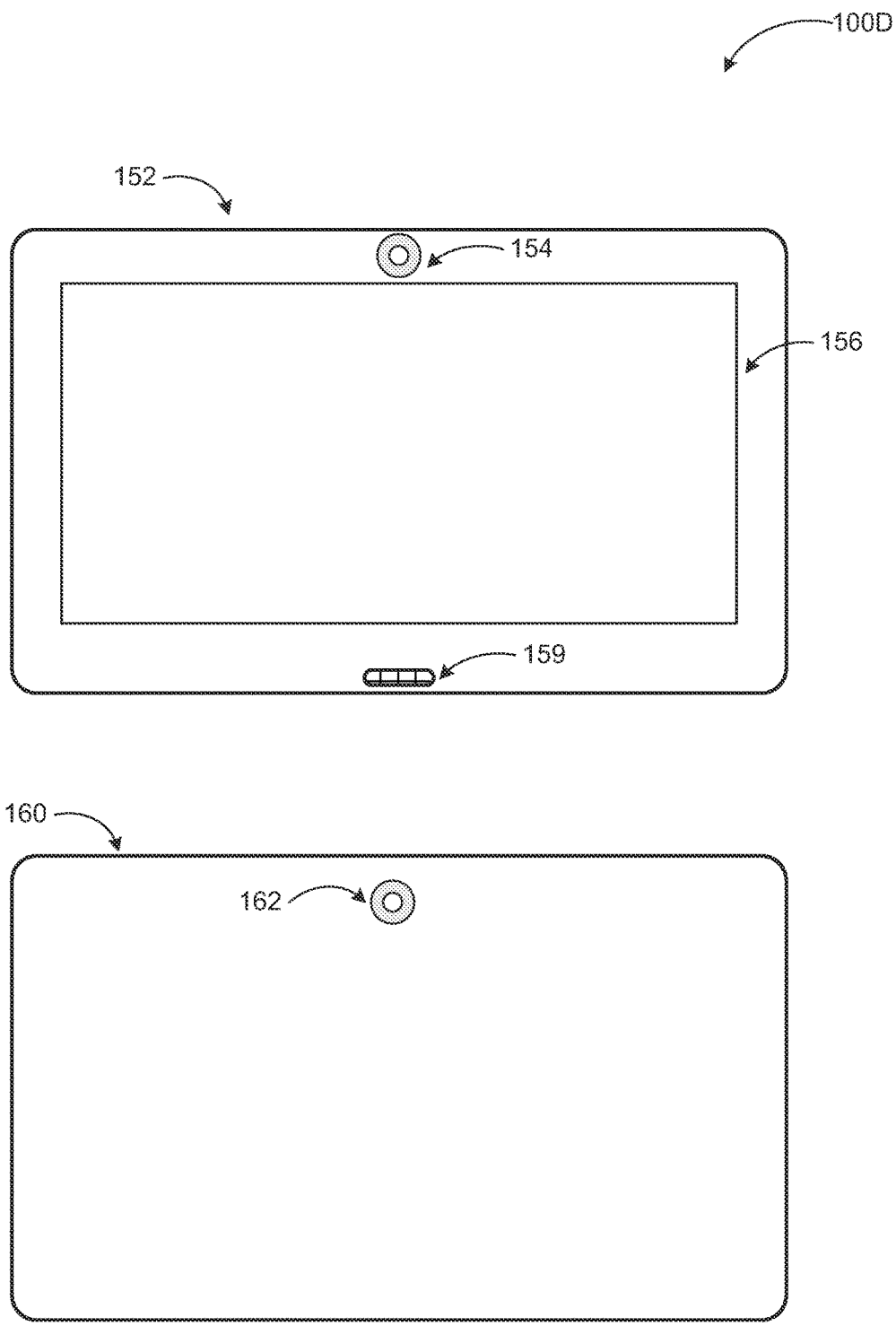

Diagram 100B of FIG. 1B shows the front view 102 and the rear view 110 of the same smart phone with additional camera options. In addition to the original two camera apertures 104 and 112, there may be two extra camera apertures 122 and 124 on the front of the camera and two extra camera apertures 126 and 128 on the rear of the camera. The camera apertures 122, 124, 126, and 128 may be optically coupled to distinct cameras or fewer than four cameras for purposes such as capturing gestures. Other example implementations may include any number of additional cameras and apertures. Further example implementations may include one or more image diversion systems with different filters in their paths such that images may be captured by the camera with different circumstances (for example, one camera aperture may capture light filtered by an ultra-violet (UV) or near infrared (NIR) filter while another camera aperture may capture visible light).

As mentioned above, some implementations of an image diversion system according to embodiments may involve wearable devices. For example, eyeglasses, scuba masks, ski goggles, bicycle helmets, football helmets, and similar wearable items may be outfitted with a camera. Diagram 100C shows a pair of ski goggles 142 outfitted with a front-facing camera 146. An image diversion system attached to the same camera may allow capture or real time display of images from an opposite direction. Thus, a skier may capture images (still images or video) of the scenery he or she is facing as well as the scenery at their back simultaneously or selectively, and view the sceneries in real time or after the time of capture on an embedded screen 144.

Diagram 100D shows yet another example implementation. The front view 152 of a tablet device may include a touch-capable display 156 and a microphone 159 along with a front-facing camera aperture 154. The rear view 160 of the same tablet device includes the rear-facing camera aperture 162. Both camera apertures may be optically coupled to an on-board camera for capturing and displaying images from the front and back of the tablet using a single camera.

In small form-factor devices such as smart phones, it may be desirable to place the image sensor parallel to the face of the phone to reduce thickness. Conventional optical assemblies may often occupy the full thickness of the phone. However, by using the full thickness of the phone for the optical assembly, one may be unable to divert the image, or look at objects, which are on both sides of the phone.

Figure 2A:
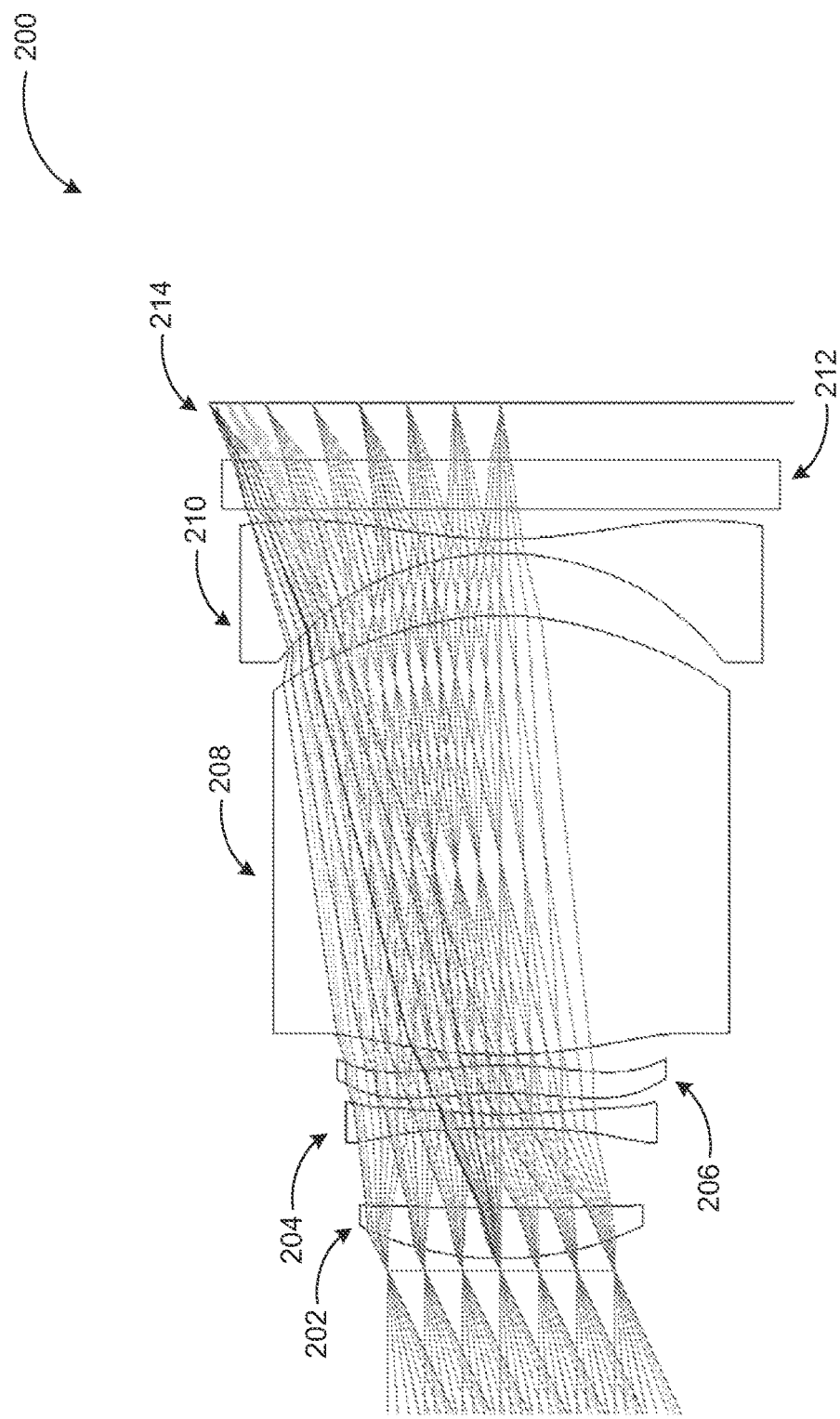
FIGS. 2A and 2B illustrate example configurations of unfolded optical elements in an optical module of an image diversion system.
Figure 2B:
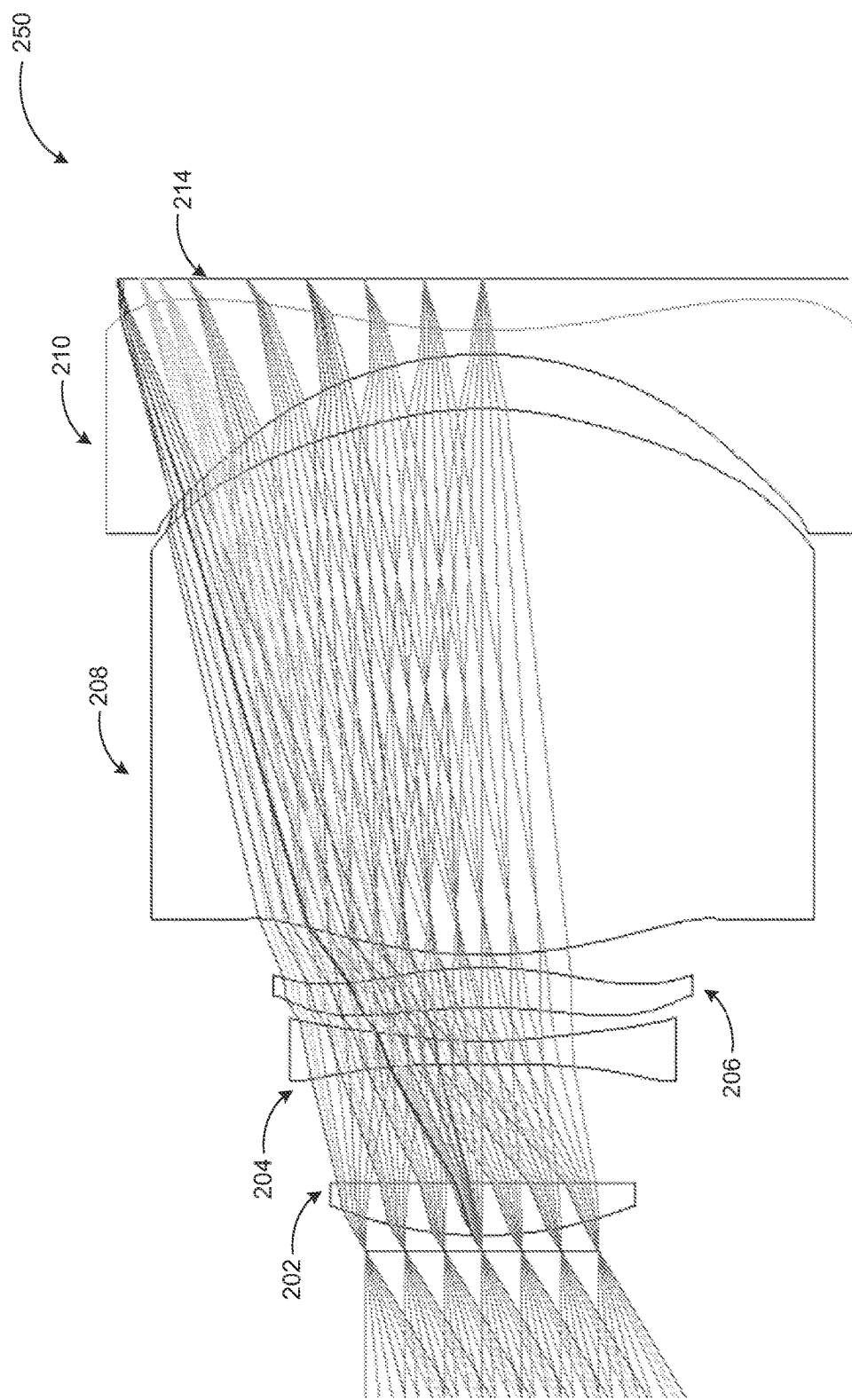

FIG. 2A illustrates what the optical switching device looks like in an unfolded view. This is intended to show the optical path of light before it is folded and redirected in one or more implementations of the optical switching device. FIG. 2B shows the elimination of one of the optical elements 212 from the configuration in FIG. 2A by integrating the elements into a single optical element for a reduced form factor. A folded implementation of the unfolded lens structure as shown in diagram 200 may both meet the thickness design requirements and periscope around the image sensor both frontwards and backwards. The configuration of the optical assembly of an unfolded image diversion system shown in diagram 200 includes centrally aligned lenses 202,

204, 206, 208, and 210 along with a cover glass 212 and sensor surface 214. The lens 208 is thick, so that it can be folded in the center. In a more traditional optical design element 208 might be 1.5 mm thick giving a total optical track of 5.9 mm. The illustrated example configuration has a G-P-P-P-P construction. A 90-degree fold prism may be optically coupled to the lens 202 allowing the optical assembly to redirect the light either forward or backward depending on the orientation of the prism. The lenses may be made from a variety of materials, such as glass, acrylic, liquid crystal, optical polymers, inorganic optical materials such as sapphire, or can be holographically constructed.

In the example configuration of diagram 200, the protective optical element or cover glass 212, and air spaces may account for a portion of the overall thickness. Element 210 may be implemented as a model glass element and incorporated into a cover slip/protective element 212 of the device containing the image diversion system. This reduced configuration has a total optical track of 8.6 mm and is shown in diagram 250 of FIG. 2B.

In addition to sets of imaging lenses, an image diversion system according to embodiments may include other optical elements such as polarizers, filters, autofocus or stabilizing elements, and similar components in the optical paths. As discussed herein, various optical elements may be relocated in a system according to embodiments to after the image diversion subsystem and before the image sensor. The image sensors may include a photodiode, a photomultiplier tube, a complementary metal oxide semiconductor (CMOS) image sensor, a time of flight sensor, a charged coupled device (CCD), and/or a micro-channel plate. A redirection element may include a rotatable prism, an active electro-optical switching interface, a frustrated total internal reflection (TIR) interface, or a beam splitter. The redirection element may be an electrochromic mirror, for example, configured to redirect the light either forward or backward depending on its orientation. The redirection element may be rotated between the different positions in any suitable manner including, for example, manually, automatically, by a motor, by a spring mechanism. In other embodiments, the redirection element may be replaced with a beam splitter providing a simultaneous view in two or more directions to the image sensor of the image capture device. In yet other embodiments, the redirection element may be an electro-optical device configured as an electro-optical field of view multiplexer. The lenses may include one or more of convex lenses, positive meniscus lenses, plano-convex lenses, and biconvex lenses. Other combinations of optical elements such as one or more of redirection elements, lenses, and inverting optics may be employed without limitation.

Figure 3A:
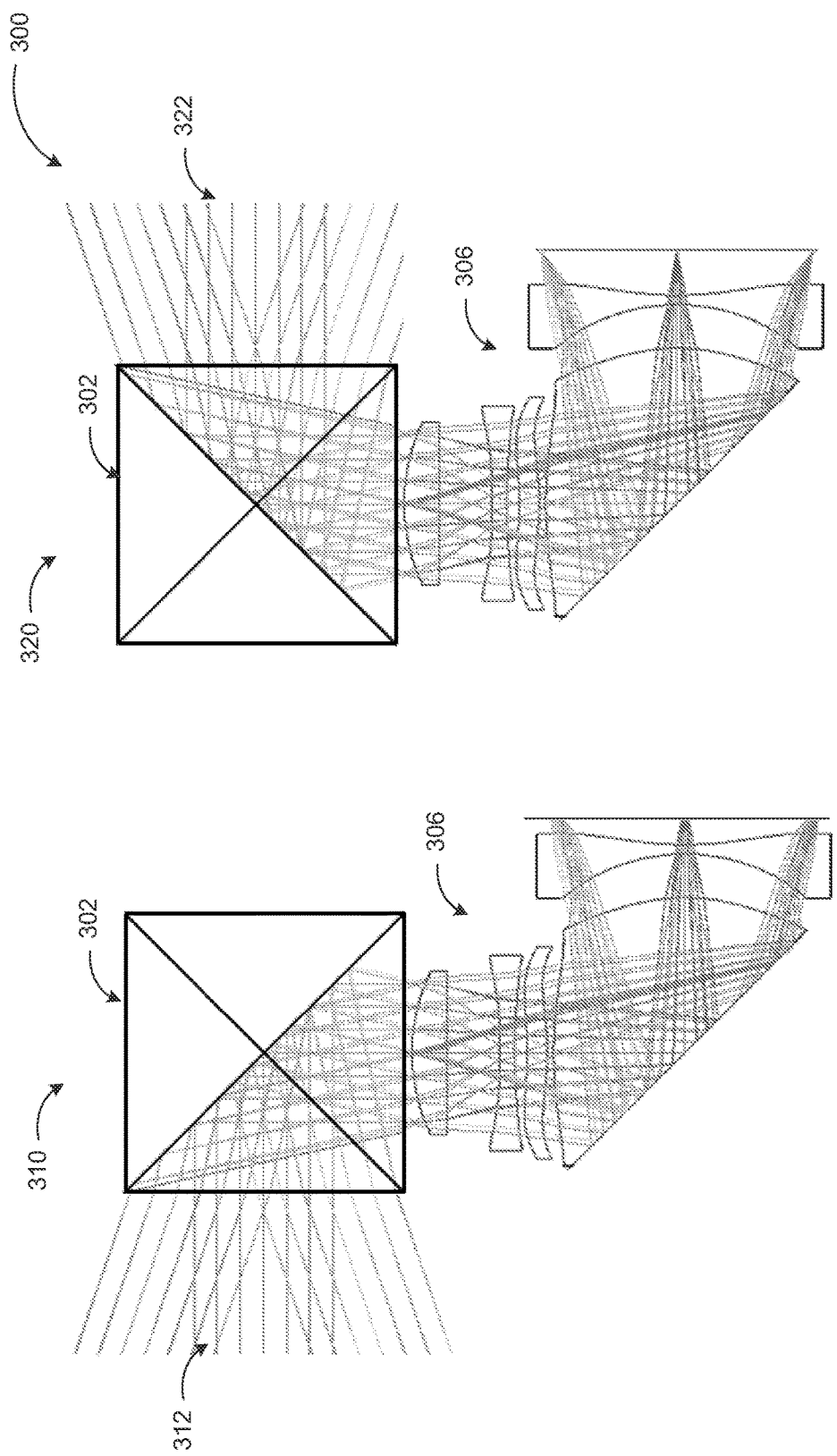
FIG. 3A through 3C illustrate examples of an electro-optical field of view multiplexer implementation of a redirection element that may be used to control direction of light to be provided to an image sensor through an image diversion system.
Figure 3B:
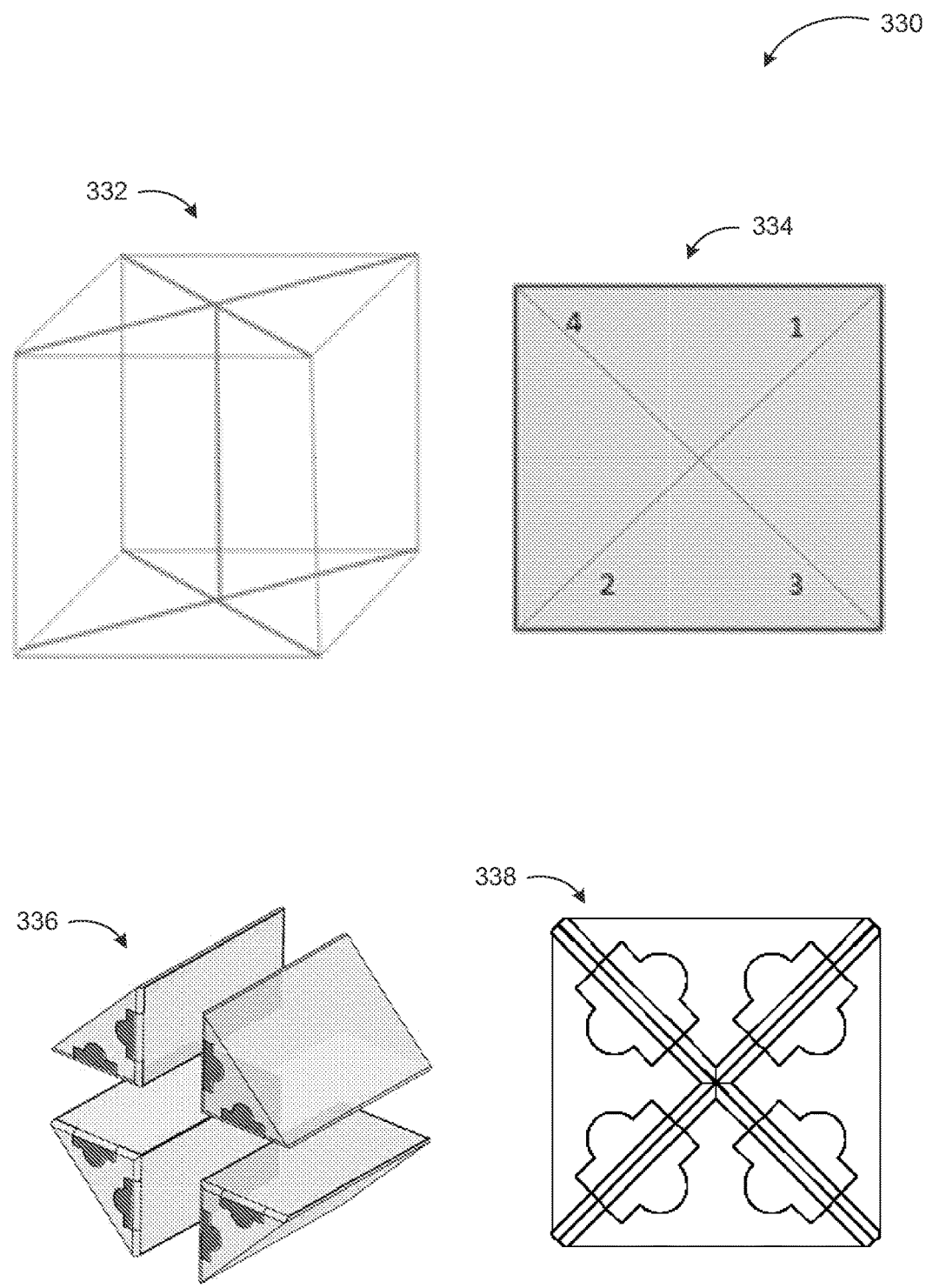
Figure 3C:
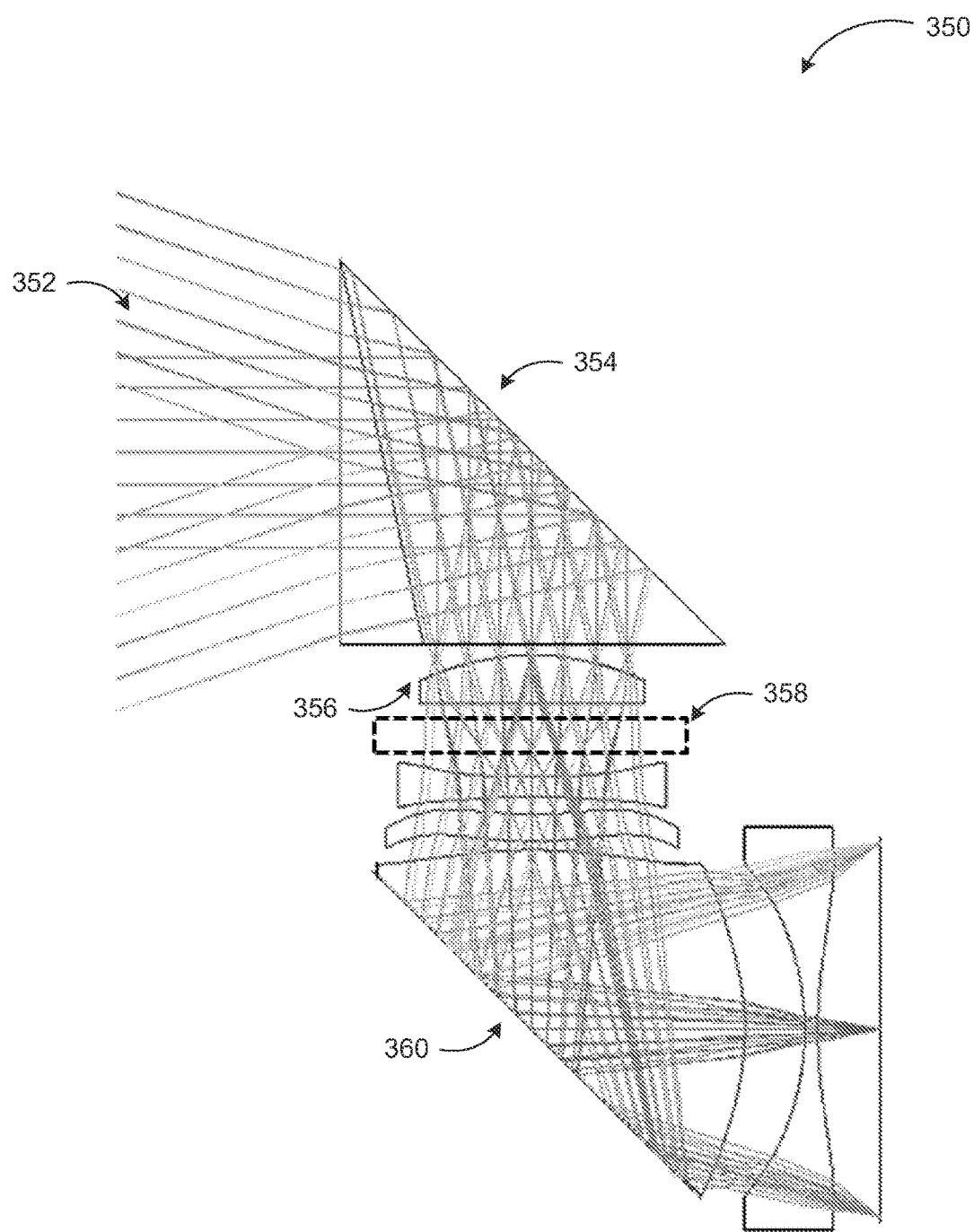

FIG. 3A through 3C illustrate examples of an electro-optical field of view multiplexer implementation of a redirection element that may be used to control direction of light to be provided to an image sensor through an image diversion system, arranged in accordance with at least some embodiments described herein.

Diagram 300 of FIG. 3A shows two example settings of an image diversion system with an electro-optical field of view multiplexer element. In configuration 310, the electro-optical field of view multiplexer 302 may be electro-optically controlled such that light 312 may be received and directed to the optical assembly 306 of the image diversion system for subsequent capture by the image sensor. In configuration 320, the electro-optical field of view multiplexer may be actuated to receive and direct light 322 from an opposite direction to the optical assembly 306. While not shown in the figure, light from both directions may also be directed to the optical assembly 306 for a superimposed or tiled capture of two images from opposite directions, or the image capture of video both frontwards and backwards, by synchronizing the electro-optical field of view multiplexer to the frame rate of the image sensor.

Diagram 330 of FIG. 3B shows a three-dimensional view 332 and a top view 334 of an electro-optical field of view multiplexer structure that may be used as the 90-degree turning element at the top of the optical assembly. In an electro-optical field of view multiplexer configuration, the turning element may be electro-optically controlled. The electro-optical field of view multiplexer may be configured to electronically control the direction of the light entering the optical assembly. That is, an image may be captured through the front of the device containing the image diversion system or back of the device, or a superposition of either. The electro-optical field of view multiplexer may be configured such that faces 1 and 2 can be activated to direct the incoming light from the front of the device to the optical assembly. Conversely, faces 3 and 4 may be activated to direct incoming light from the back of the device to the optical assembly. The electro-optical switching may be accomplished with a variety of optical technologies including, but not limited to, electro-chromic mirrors, electrically switchable trans-reflective mirrors, electro-optic polymers, or other suitable optical technologies.

Diagram 330 further shows, electro-optical field of view multiplexer configurations 336 and 338, where configuration 336 is an exploded isometric view of an electro-optical field of view multiplexer, showing the shapes of the sections and the electrical contacts for the electrochromic coating. Configuration 338 shows an end view of the electro-optical field of view multiplexer with the coatings and electrical contacts. The electro-optical field of view multiplexer may also be rotated to accept incoming light from any arbitrary direction.

FIG. 3C illustrates an example image diversion system with an autofocus element, arranged in accordance with at least some embodiments described herein.

As shown in diagram 350, a folded image diversion system with redirection interface 360 and reflection prism 354 may receive light 352 from the environment and provide to an image sensor. As discussed above, a number of lenses may be included in the optical assembly of the image diversion system.

In some examples, autofocus capability may be provided by making one of the lenses such as lens 356 an adjustable lens (for example, a liquid lens or an electrically focusable lens). In other examples, an additional autofocus element 358 may be included within the set of lenses and controlled by the imaging system that controls the image sensor. The autofocus element may also be manually adjustable.

In addition to autofocus, other subsystems such as image stabilization as well as components from the optical assembly including, but not limited to, lenses, polarizers, optical filters, or partial reflectors may be included between the image diversion element and the image sensor.

FIG. 4A through 4E illustrate example configurations of an image diversion system, arranged in accordance with at least some embodiments described herein.

Figure 4A:
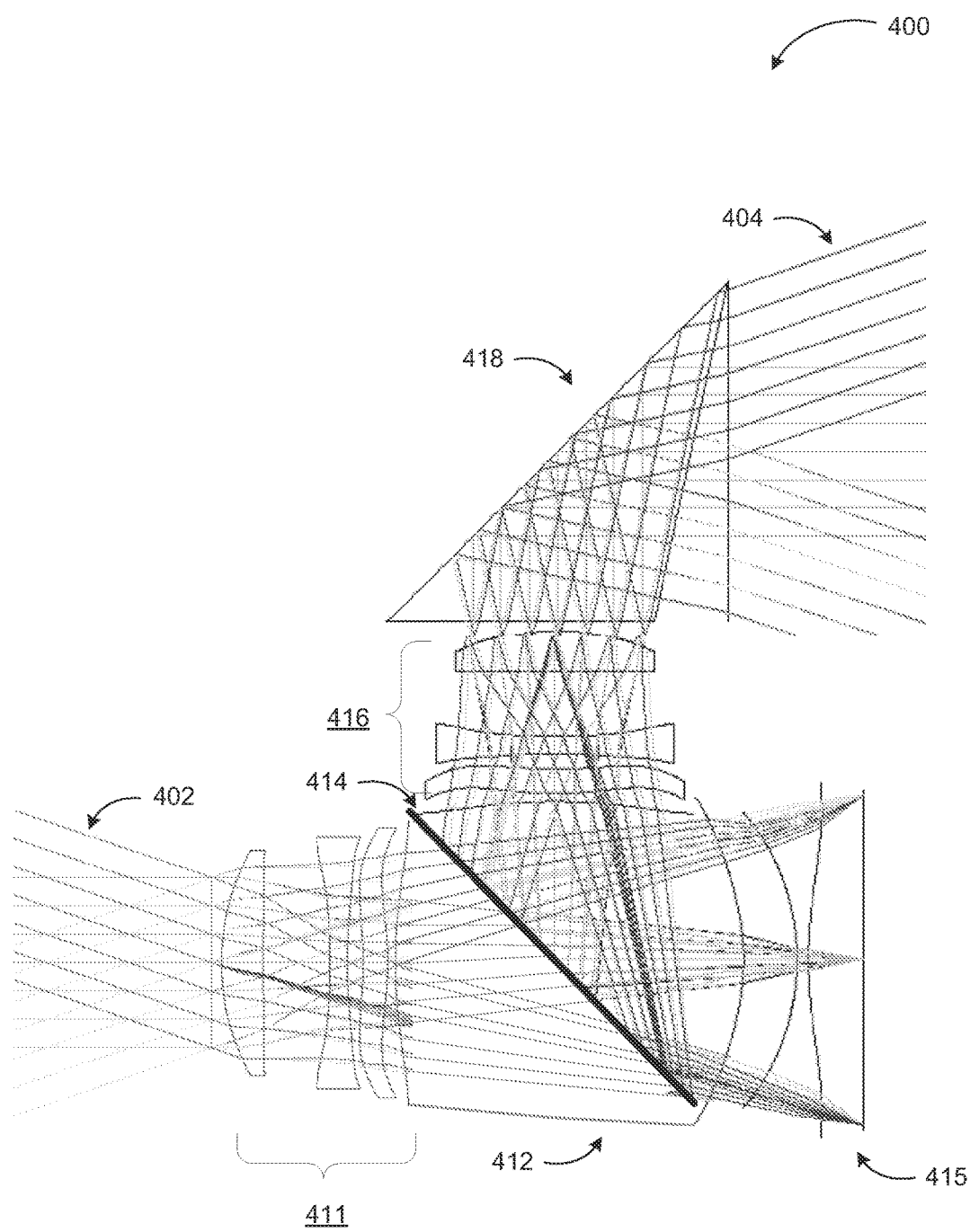
FIG. 4A through 4E illustrate example configurations of an image diversion system.

Diagram 400 of FIG. 4A shows one example configuration, where two sets of lenses 411 and 416 of an optical assembly of the image diversion system are perpendicularly positioned. The set of lenses 416 may receive incoming light 404 through a redirection element 418, which may be a mirror or prism configured to redirect light 90 degrees from its original direction toward the set of lenses 416. The set of lenses 411 may receive light without redirection. An optically switchable interface 414 positioned within a thick lens element 412 may be used to select which optical path (set of lenses 411 or set of lenses 416) is to be used to capture the image. Thus, an image sensor 415 of the optical assembly may receive light (capture an image) from one of the two opposing directions shown in the diagram, where the optical apertures are offset. Unlike conventional systems, example embodiments allow offset apertures as well as the mounting of the image sensor parallel to the device housing. Many smartphones and other mobile devices may be too thin to allow the image sensor to be mounted perpendicular to the housing. The incoming light goes through two 90-degree deflections to provide this parallel mounting of the image sensor.

Figure 4B:
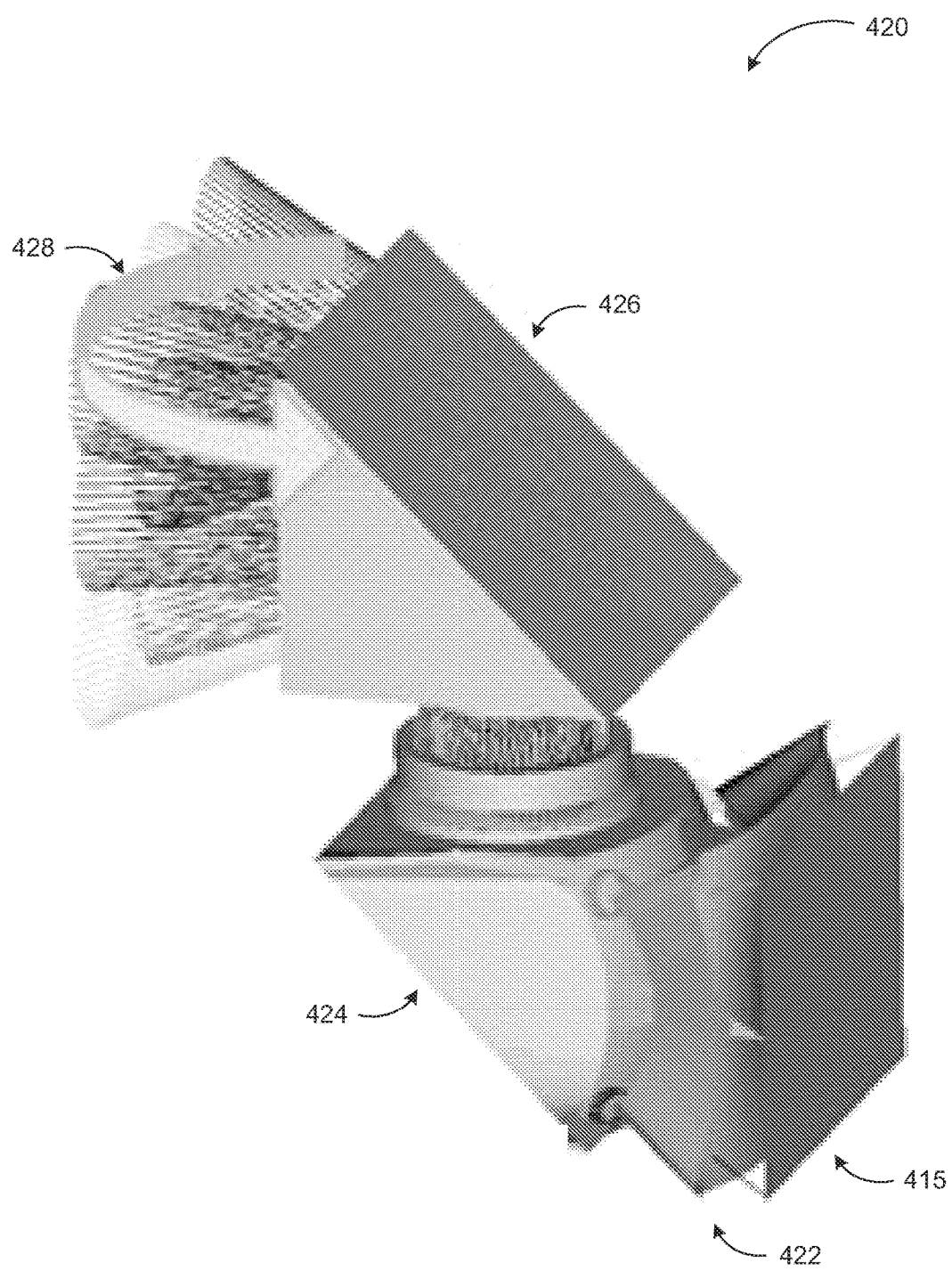

Diagram 420 of FIG. 4B shows an example implementation of another configuration of an image diversion system. In the example configuration, the redirection element 418 may be incorporated into a rotatable housing 426, which may be rotated 428 to receive light from different directions including opposite directions. Interface 424 can be a mirror, TIR surface, or an optically switchable interface that may direct captured light through additional optical elements to an image sensor at interface 415. Thus, images from multiple directions may be captured with a single optical path in the image diversion system through the rotation of the redirection element. The rotation may be accomplished manually or through automatic control such as mechanical or electro-optical actuation. This configuration allows the mounting of the image sensor parallel to the device housing.

Figure 4C:
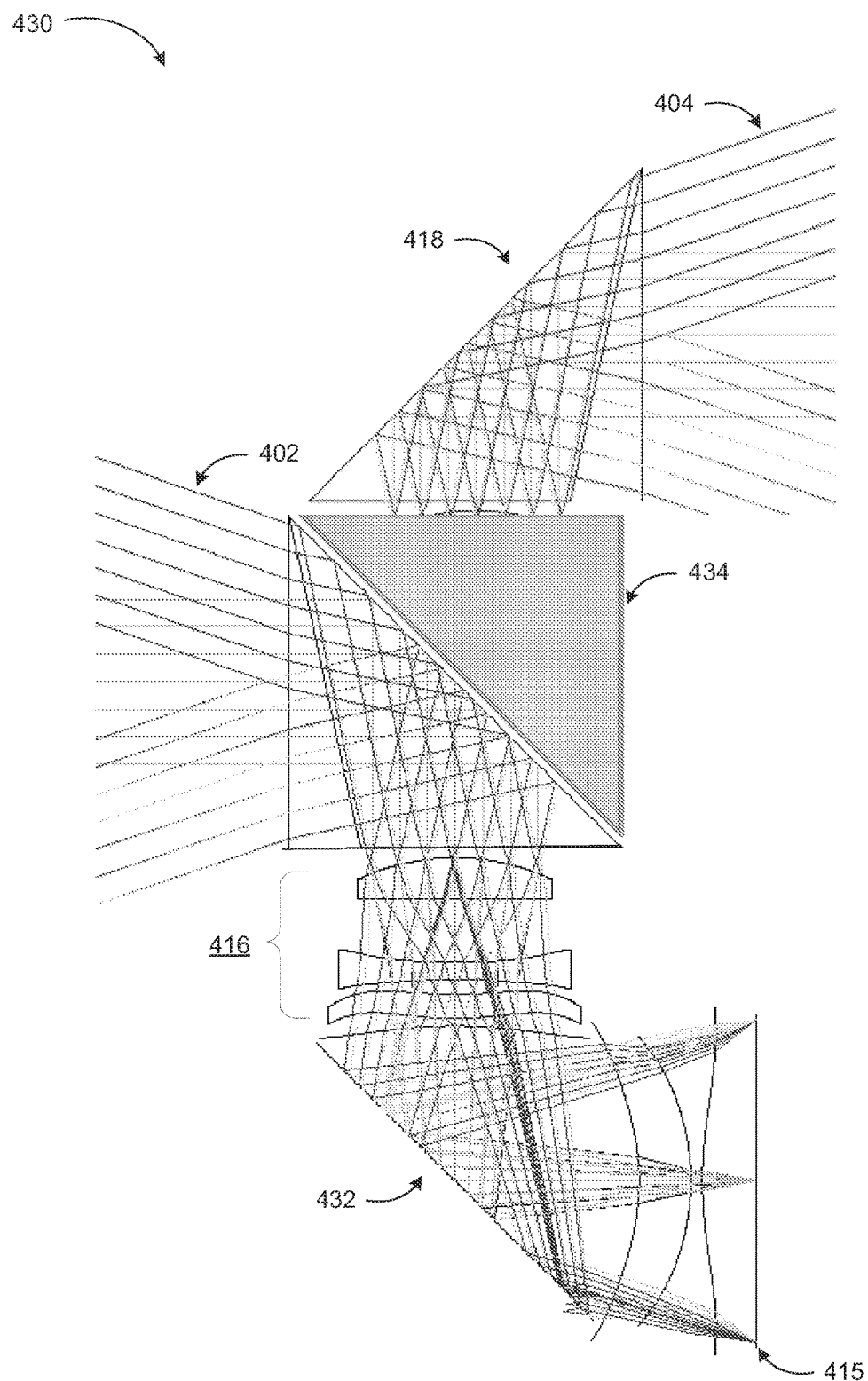

Diagram 430 of FIG. 4C shows another offset image diversion system configuration. In the example configuration, the optical apertures for capturing light 402 and 404 (which are offset from each other) are also offset from a position of the image sensor coupled to the interface 415. This may be accomplished through the use of an additional redirection element 432 (a mirror, prism, or other reflective surface). The optically switchable interface 434 may allow selection of one of the optical apertures for image capture. The optically switchable interface 434 may also be implemented as a frustrated TIR interface. This configuration allows offset apertures as well as the mounting of the image sensor parallel to the device housing.

Figure 4D:
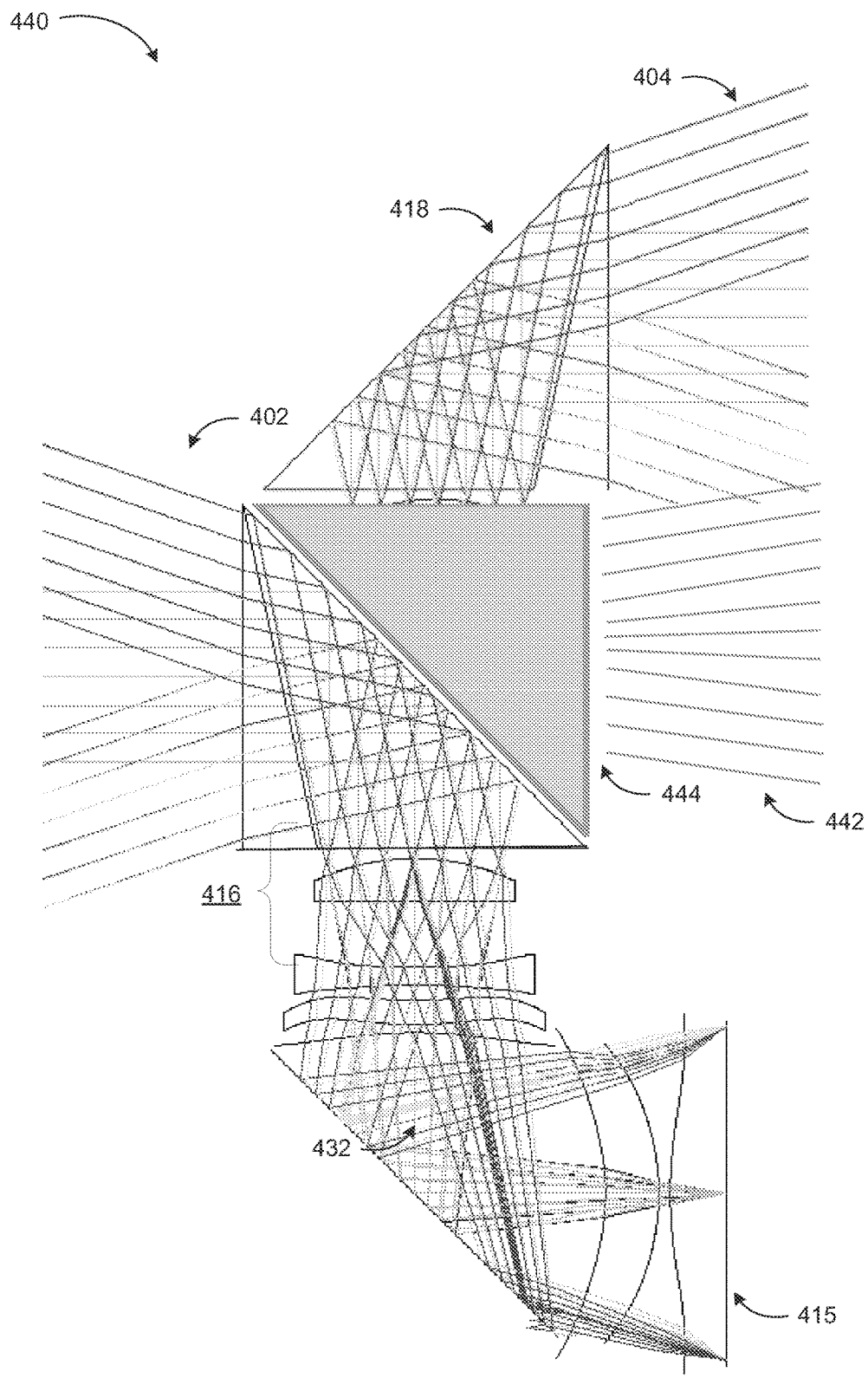

Diagram 440 of FIG. 4D shows a configuration similar to that of FIG. 4C, where the optically switchable interface 444 may be implemented also as a redirection element allowing light 442 to be captured through a third optical aperture. Thus, a single image sensor may be used in conjunction with three separate optical apertures. This configuration allows offset apertures as well as the mounting of the image sensor parallel to the device housing. This also allows the third non-aligned aperture to support a special purpose lens, such as a fisheye lens.

Figure 4E:
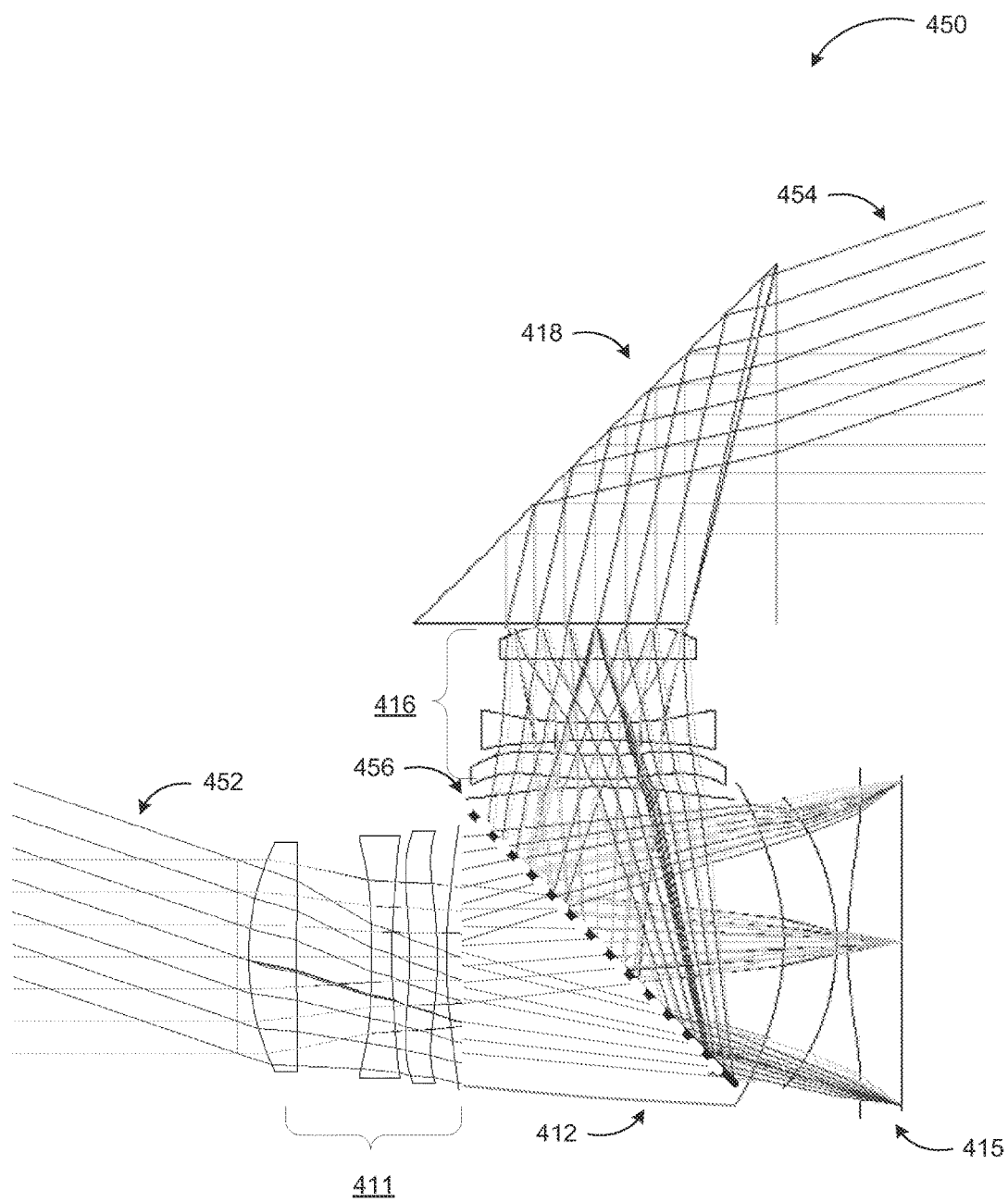

Diagram 450 of FIG. 4E shows an image combination configuration through the use of a beam splitter. The configuration shown in diagram 450 is similar to the configuration of image diversion system in FIG. 4A with similarly numbered components having similar functionality. Differently from the configuration of FIG. 4A, the image diversion system in FIG. 4E may include a beam splitter 456 to allow portions of the received light 452 and 454 to be directed to the interface 415 simultaneously such that portions of two images in opposite directions (or multiple images from multiple directions) can be superimposed or tiled. In one example implementation, half the field angles from the front optical aperture may be allowed to pass through the optically switchable interface 456 and half the field angles from the back optical aperture may be allowed to pass through optically switchable interface 456. To provide beam splitting, in one example, half of optically switchable interface 456 may be made of a mirrored or reflective surface. The reflective half may allow the image sensor to see frontwards and the other half may allow the image sensor to see backwards. Of course, other ratios of reflective versus non-reflective surfaces may also be used. This configuration allows offset apertures as well as the mounting of the image sensor parallel to the device housing.

Figure 5:
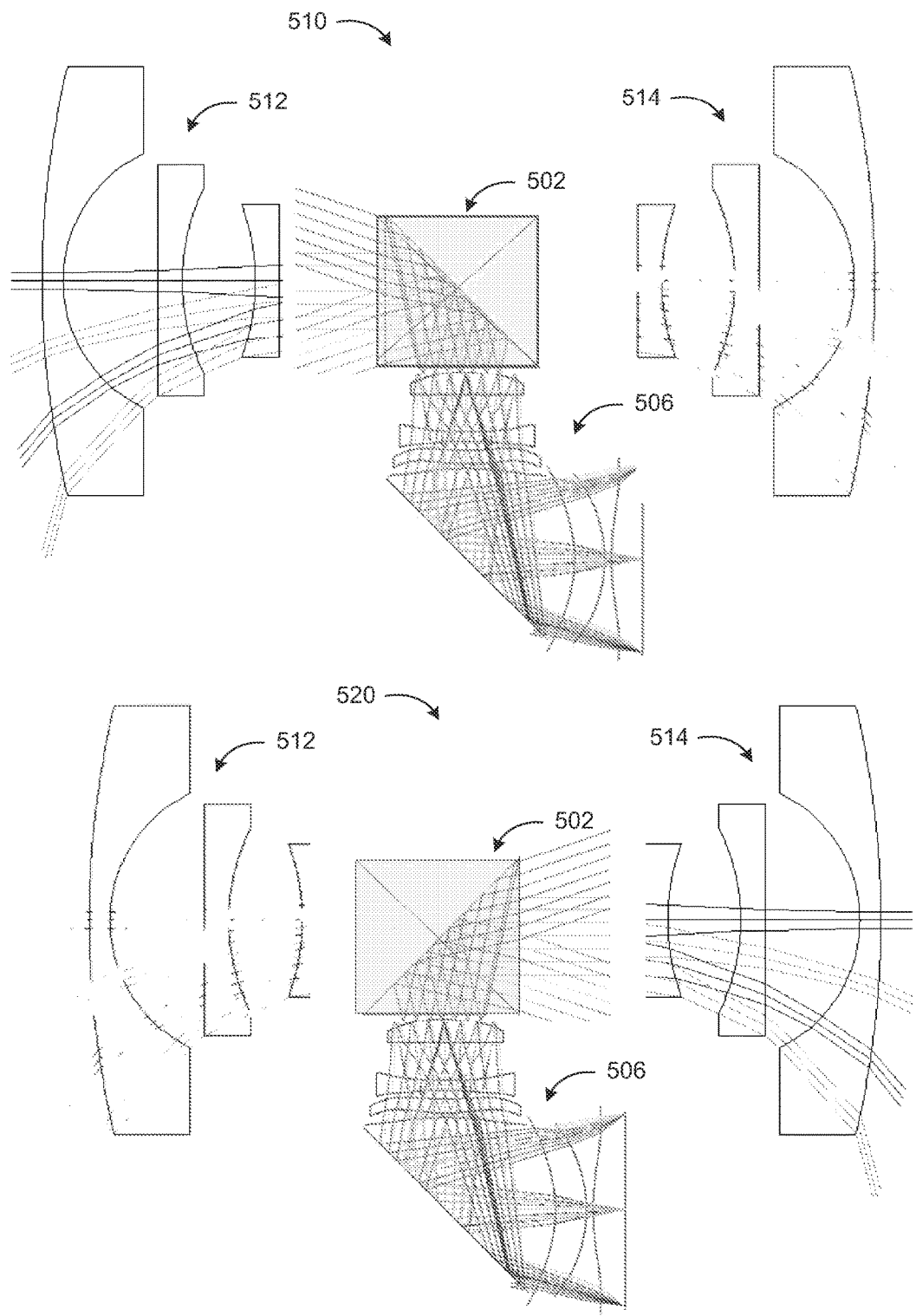
FIG. 5 illustrates two other example settings of an image diversion system with an electro-optical field of view multiplexer element that may be used in a spherical implementation.

FIG. 5 illustrates two other example settings of an image diversion system with an electro-optical field of view multiplexer element that may be used in a spherical implementation, arranged in accordance with at least some embodiments described herein.

Configurations 510 and 520 show optical elements 512 and 514, shown in opposing directions, which are fisheye lenses configured along a substantially circular perimeter as part of a spherical image capture structure. In configuration 510, the electro-optical field of view multiplexer 502 may be electro-optically controlled such that light focused by the optical elements 512 may be received and directed to the optical assembly 506 of the image diversion system for subsequent capture by the image sensor. In configuration 520, the electro-optical field of view multiplexer may be actuated to receive and direct light focused by the optical elements 514 from another direction (for example, opposite) to the optical assembly 506. The combined images from the two fisheye lenses can be combined to provide a 360-degree view.

Figure 6:
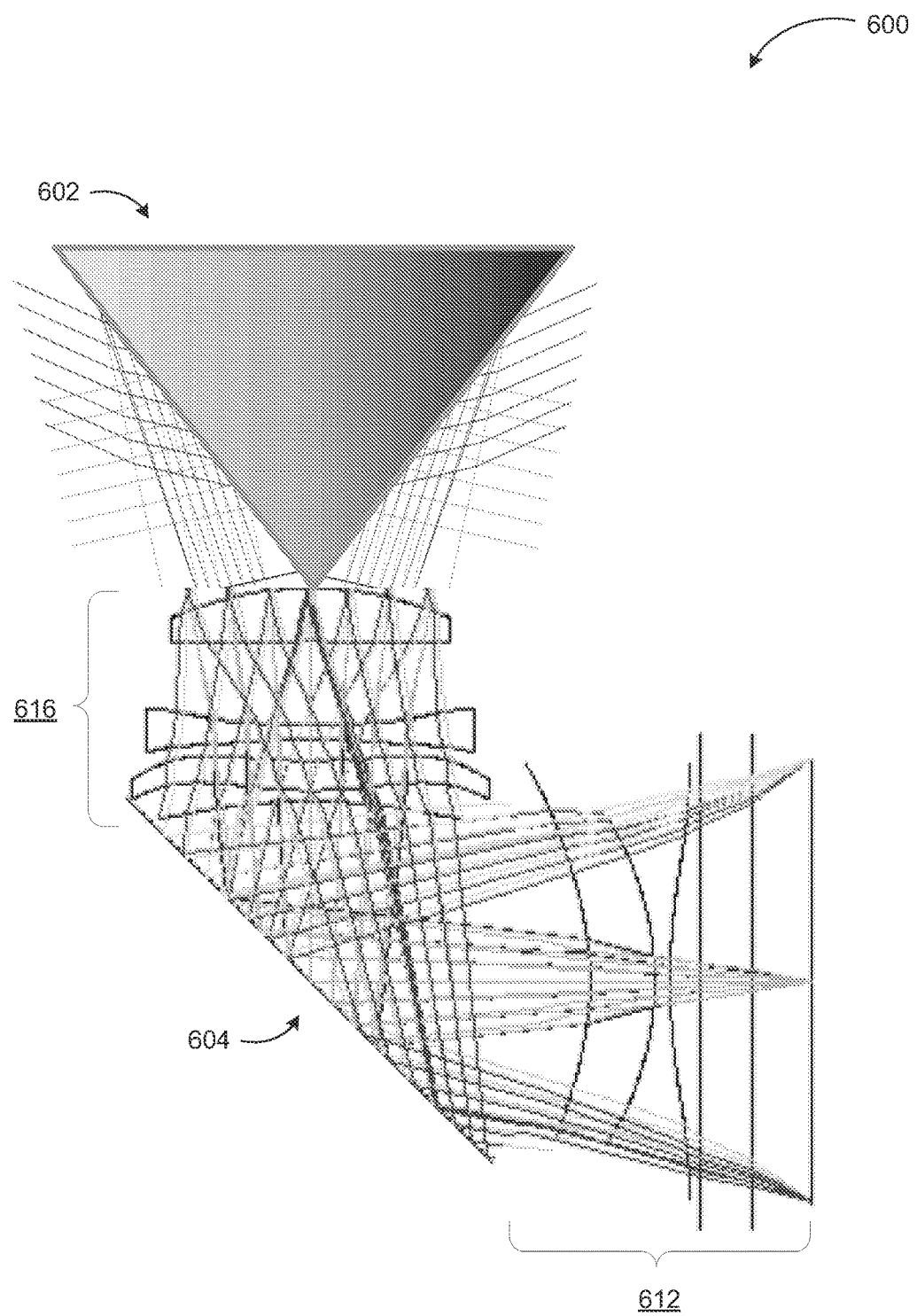
FIG. 6 illustrates an example conical element configuration of an image diversion system for capture of panoramic or 360 degree images.

FIG. 6 illustrates an example conical element configuration of an image diversion system for capture of panoramic images, arranged in accordance with at least some embodiments described herein.

Diagram 600 shows a folded image diversion system configuration with an additional conical element 602. The folded image diversion system with redirection interface 604 may receive light through the set of lenses 616 and direct received light through the set of lenses 612 to an image sensor. The conical element 602 positioned adjacent to an exterior element of the set of lenses 616 may allow collection of light in a panoramic manner such that panoramic images (or video) can be captured. The conical element may be made using any suitable material with its reflective surfaces covered or formed using a suitable technique such as metallic reflective material deposition, glazing, and similar techniques.

FIG. 7A through 7H illustrate various configurations and components of optical systems implementing image diversion through an electro-optical field of view multiplexer, arranged in accordance with at least some embodiments described herein.

In the example configurations of FIG. 7A through 7H, optical subsystems, diversion elements, and an image sensor may be contained in a housing that may be stacked to form an array of modular cameras, for example. The images from these cameras may be composited using hardware, software, or a combination thereof to create different views. Such modular cameras may be compact, weigh less, and require less power to operate allowing implementations for consumer, drone, virtual reality, and other applications where space, weight, and battery consumption may be needed.

Figure 7A:
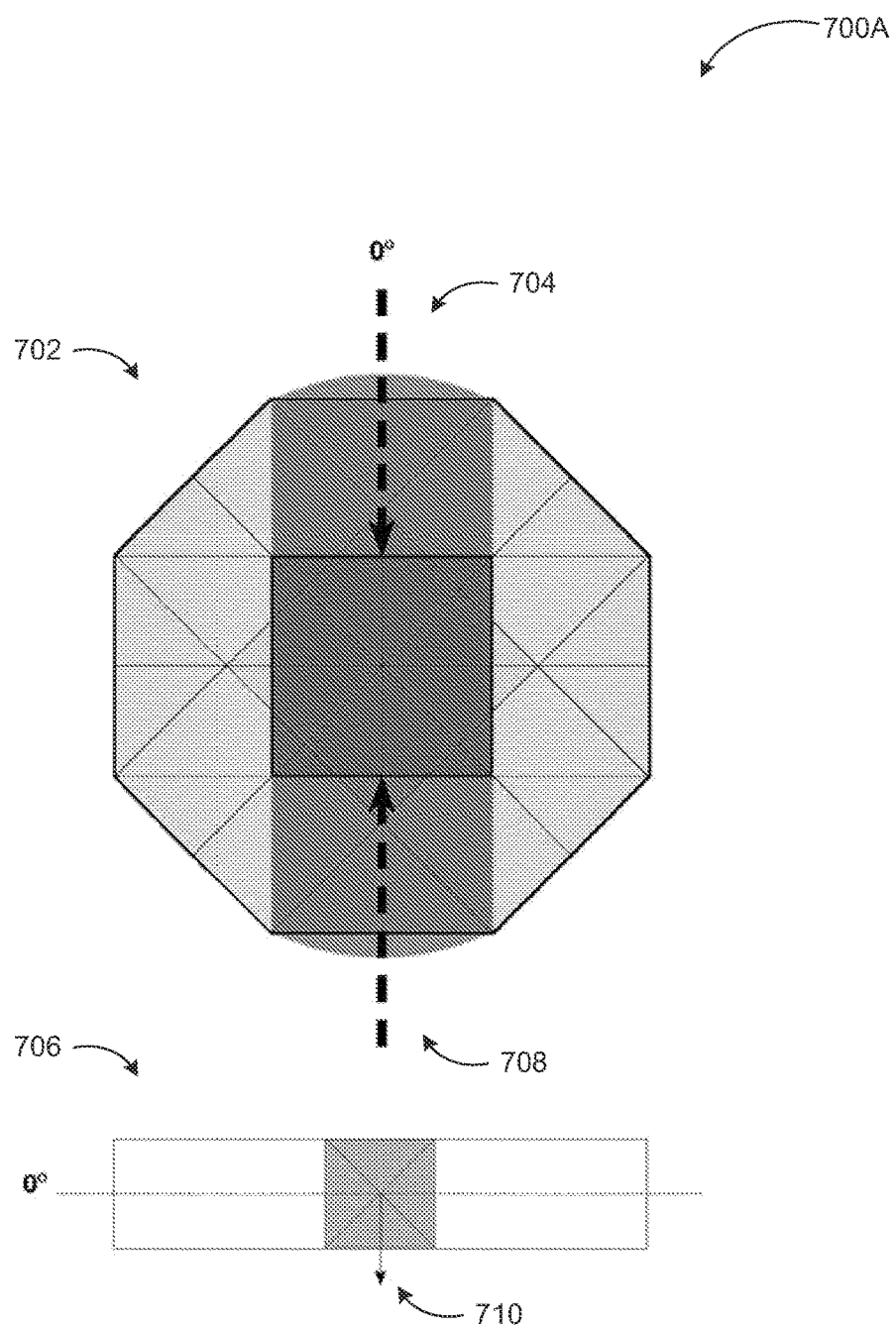
FIG. 7A through 7H illustrate various configurations and components of optical systems implementing image diversion through an electro-optical field of view multiplexer.

Diagram 700A in FIG. 7A shows a fixed electro-optical field of view multiplexer implementation where the modular camera supports front and back views. A top view 702 of the modular camera includes the ingress of light from opposite directions (704 and 706) and a side view 708 of the modular camera includes an egress of the redirected light in a direction 710 perpendicular to the camera plane.

Figure 7B:
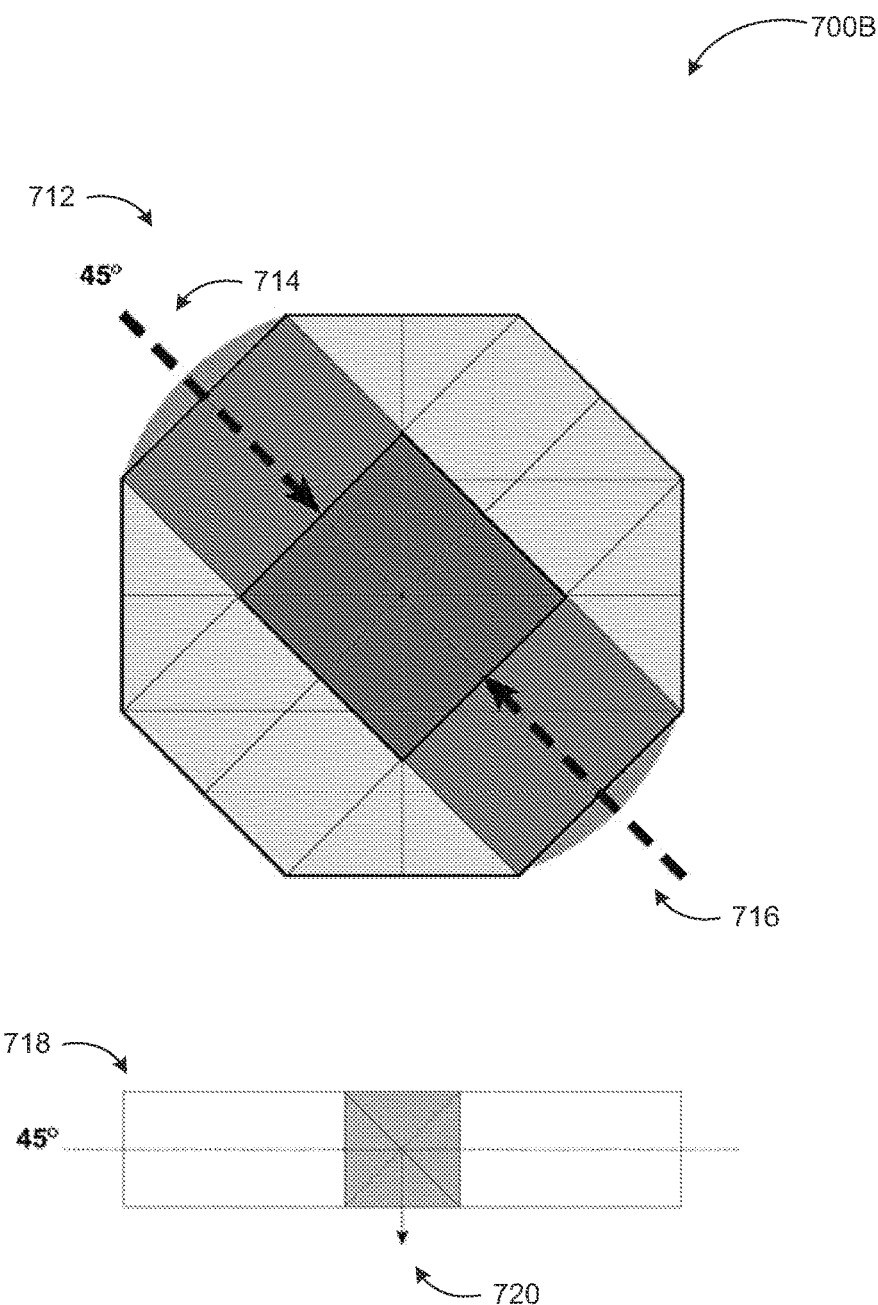

Diagram 700B in FIG. 7B shows a rotating electro-optical field of view multiplexer implementation where the modular camera may be rotated to capture views in any direction on the plane. A top view 712 of the modular camera includes the ingress of light from opposite directions (714 and 716), which may be incremented through the 360 degrees of the plane of the camera and a side view 718 of the modular camera includes an egress of the redirected light in a direction 720 perpendicular to the camera plane.

Figure 7C:
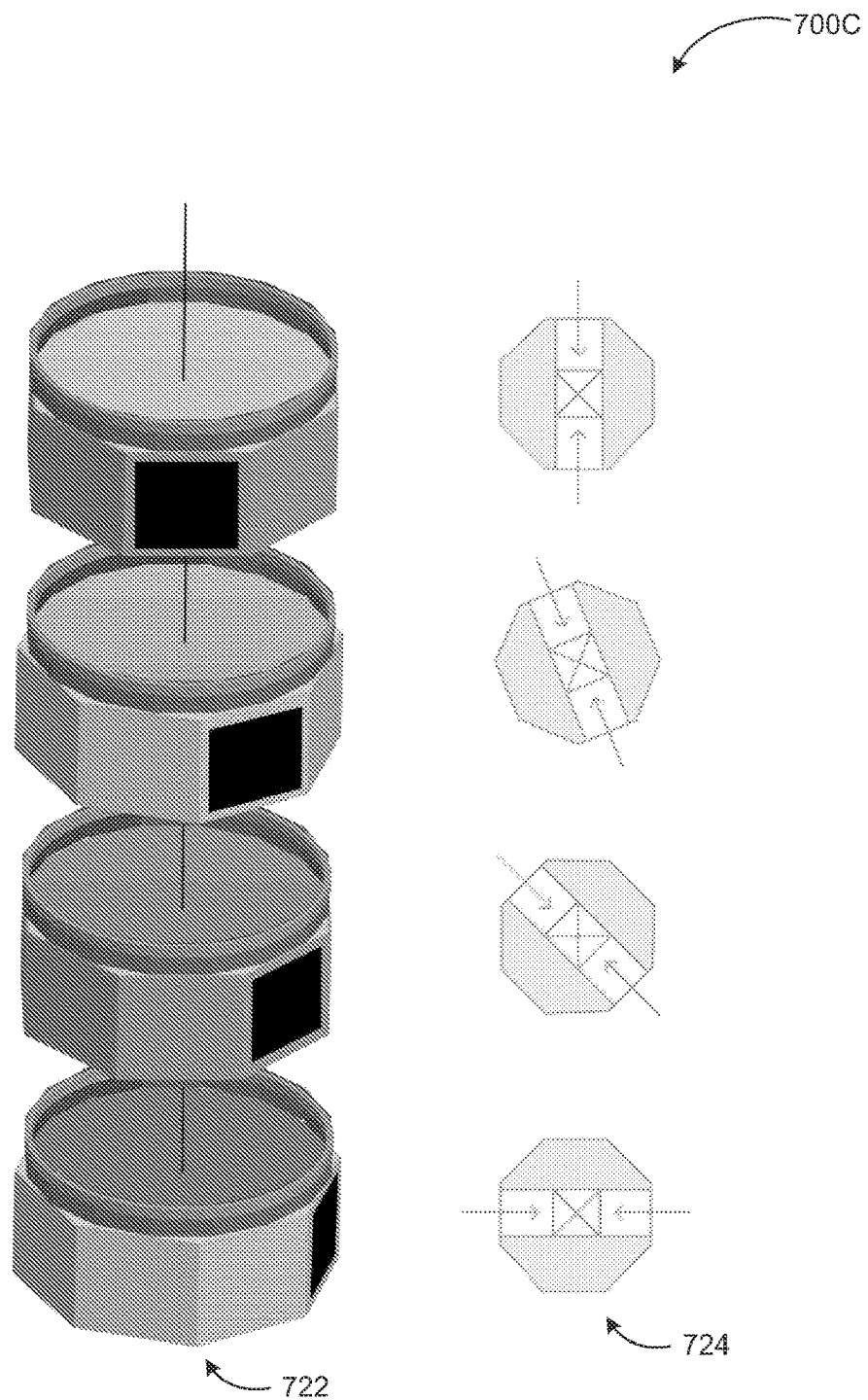

Diagram 700C in FIG. 7C shows a stack of rotating electro-optical field of view multiplexer camera modules 722 implementation, where the individual modular cameras may be rotated independently from each other to capture multiple views in any direction on the plane at the same time. A top view 724 of the stacked modular cameras illustrates how individual cameras may be rotated to specific angles and capture views at those angles. The camera modules may be aligned along a central axis. With such an example configuration, panoramic views may be captured using a single image sensor, for example. In the example, each electro-optical field of view multiplexer module may support any number of dual cameras that can be rotated in any direction (but not out of plane). In other embodiments, the electro-optical field of view multiplexer modules are not limited to dual cameras or quad cameras; there may be additional views. Captured images may be post-processed if the stack is high enough that there is a substantial vertical distance between the top and bottom cameras.

Figure 7D:
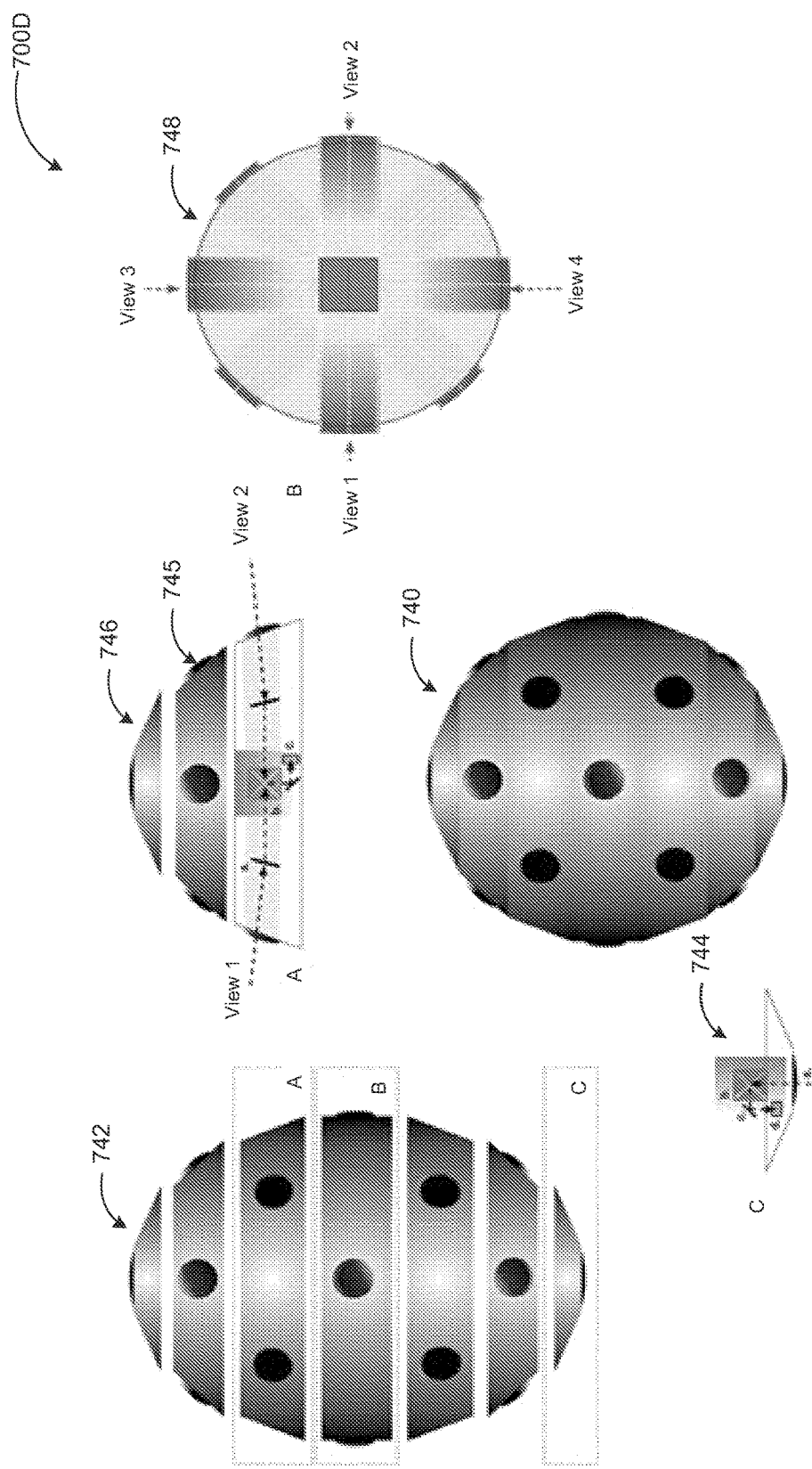

Diagram 700D in FIG. 7D includes a stacked camera module configuration 742 similar to the configuration in FIG. 7C, but the individual cameras (for example, camera 745) are shaped such that the stack forms a spherical camera module 740. The image capture apertures of the cameras may be distributed on the surface of the spherical camera module 740 such that a maximum field of view or a focused field of view are captured. Top view 748 illustrates how incoming light on the camera plane is received (in a quad camera configuration from four different directions) and redirected as shown in side view 744 such that the redirected light can be provided to an image sensor at a top or bottom element of the stack (for example, element 746).

Figure 7E:
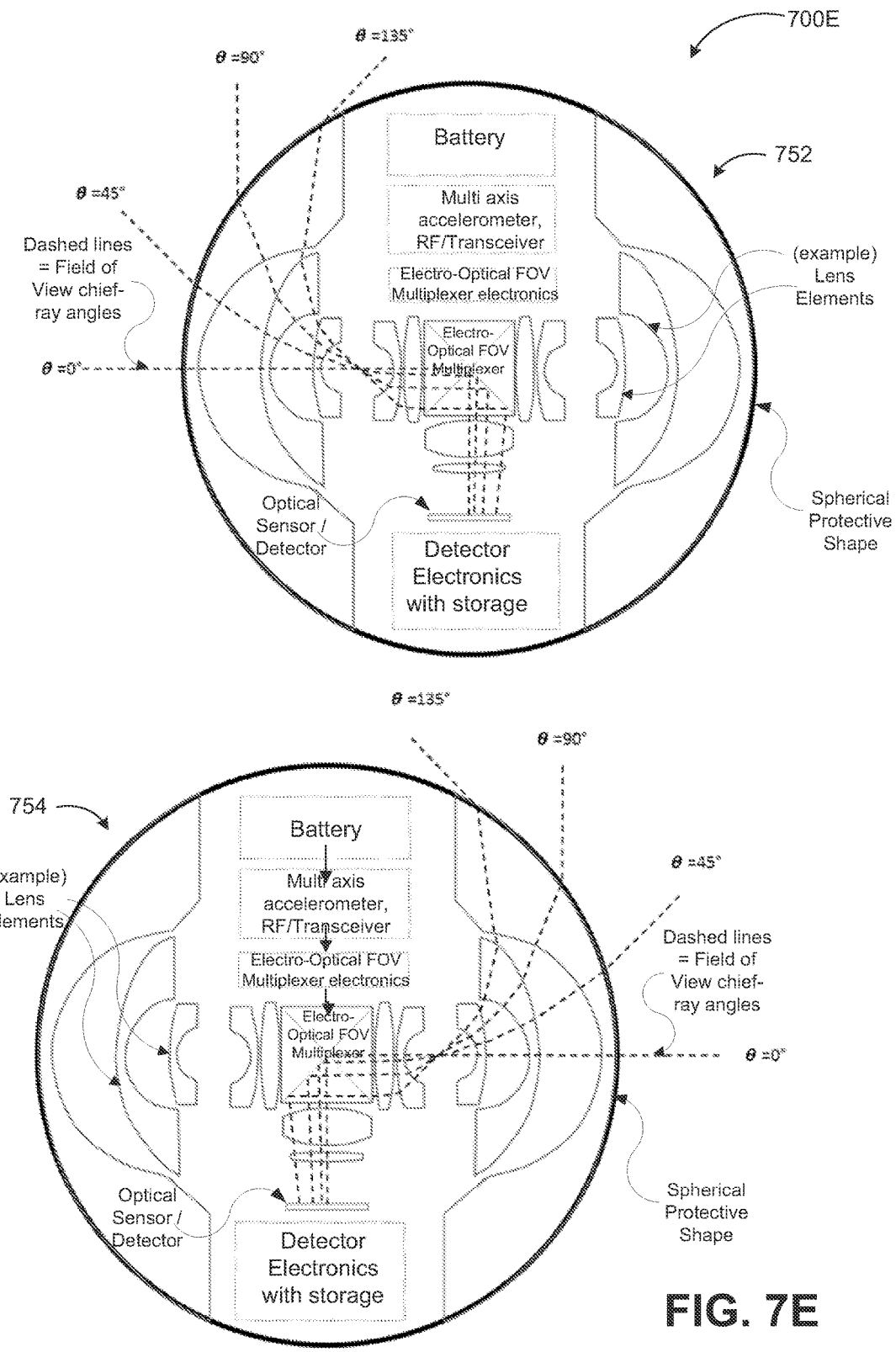

Diagram 700E in FIG. 7E shows capture of light from different angles in two hemispherical views 752 and 754, and redirection to and image sensor within the spherical camera module. Example spherical camera modules may be manufactured in a very small size, allowing the modules to be shot as a projectile. These projectile camera modules may be fitted with a transmitter that may allow them to beam images back to a user, in flight and/or after camera modules land. An accelerometer may be included for in flight image reconstruction. This may be useful for areas where it may be too dangerous for a human to enter such as hostage situations, military engagements, chemical spills, and so on.

Figure 7F:
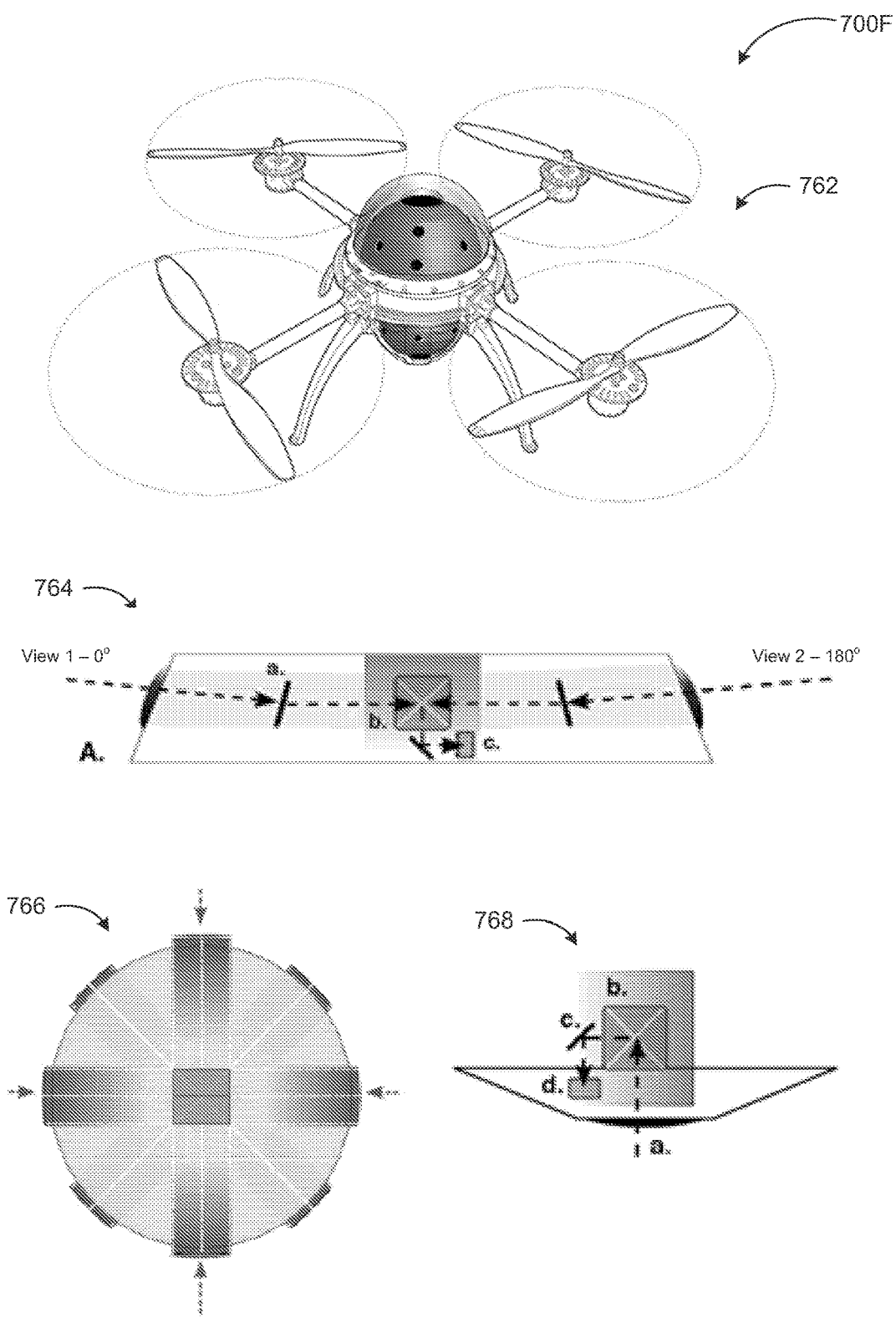

Diagram 700F in FIG. 7F shows a spherical camera module fitted in a drone 762. Sub-components of the spherical camera module may be constructed and function similar to the components of the spherical camera module 740 in FIG. 7D. Side view 764 shows redirection of light captured from two opposing directions in a single camera. Top view 766 shows capture of light from four different directions in a quad configuration. And, side view 768 shows redirection of light to an image sensor on board the spherical camera module.

Figure 7G:
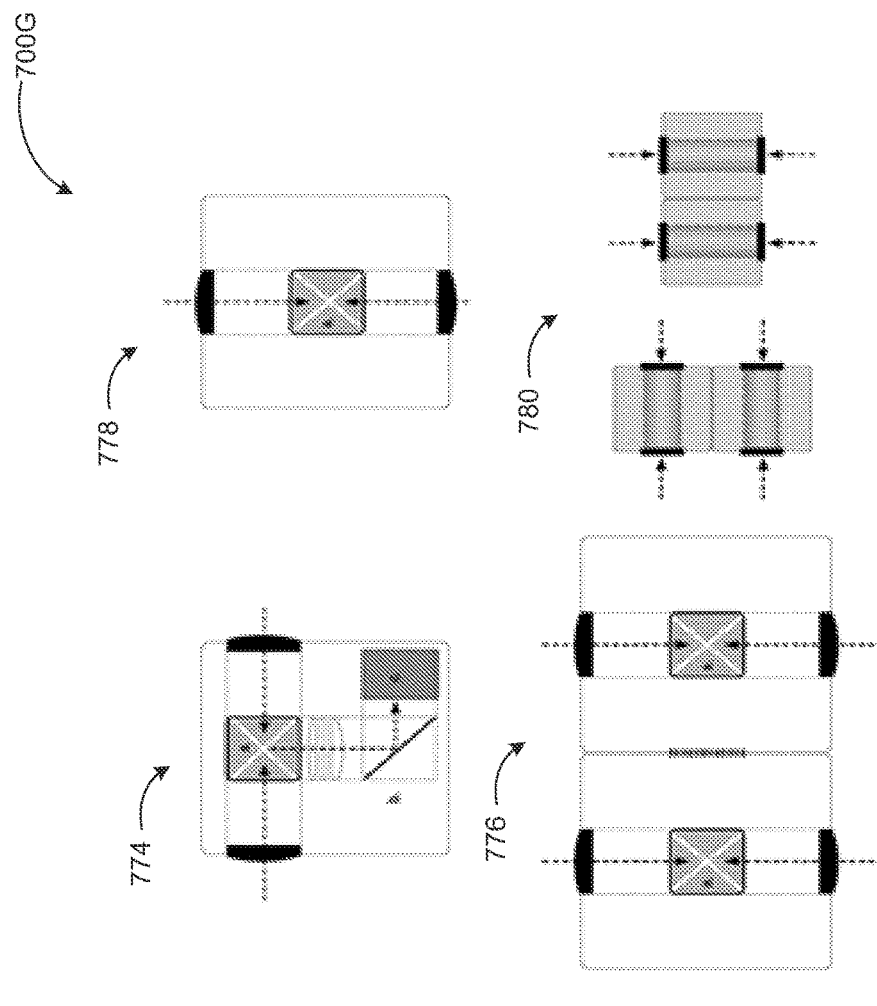
Figure 7G:
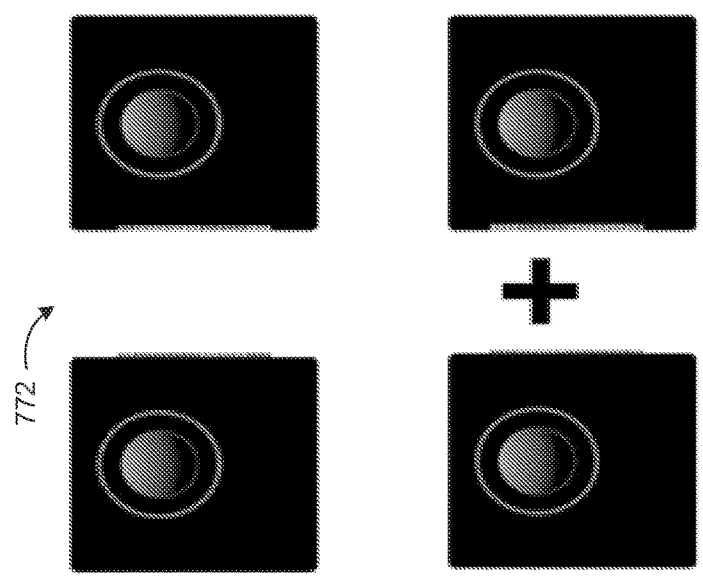

Diagram 700G in FIG. 7G shows an example embodiment, where pairs of modular cameras may be used to create a stereoscopic view. Example embodiments may typically be used to create 3D or virtual reality content. In an example implementation, two dual view cameras may be combined (772). Side view 774 shows how images may be captured by the front and back cameras and redirected to an image sensor. Top view 778 shows capture of opposite direction images by a camera. Top view 776 shows how the captured images may be combined for three-dimensional stereo view. Diagram 780 shows an example of how 360-degree stereo camera may function.

Figure 7H:
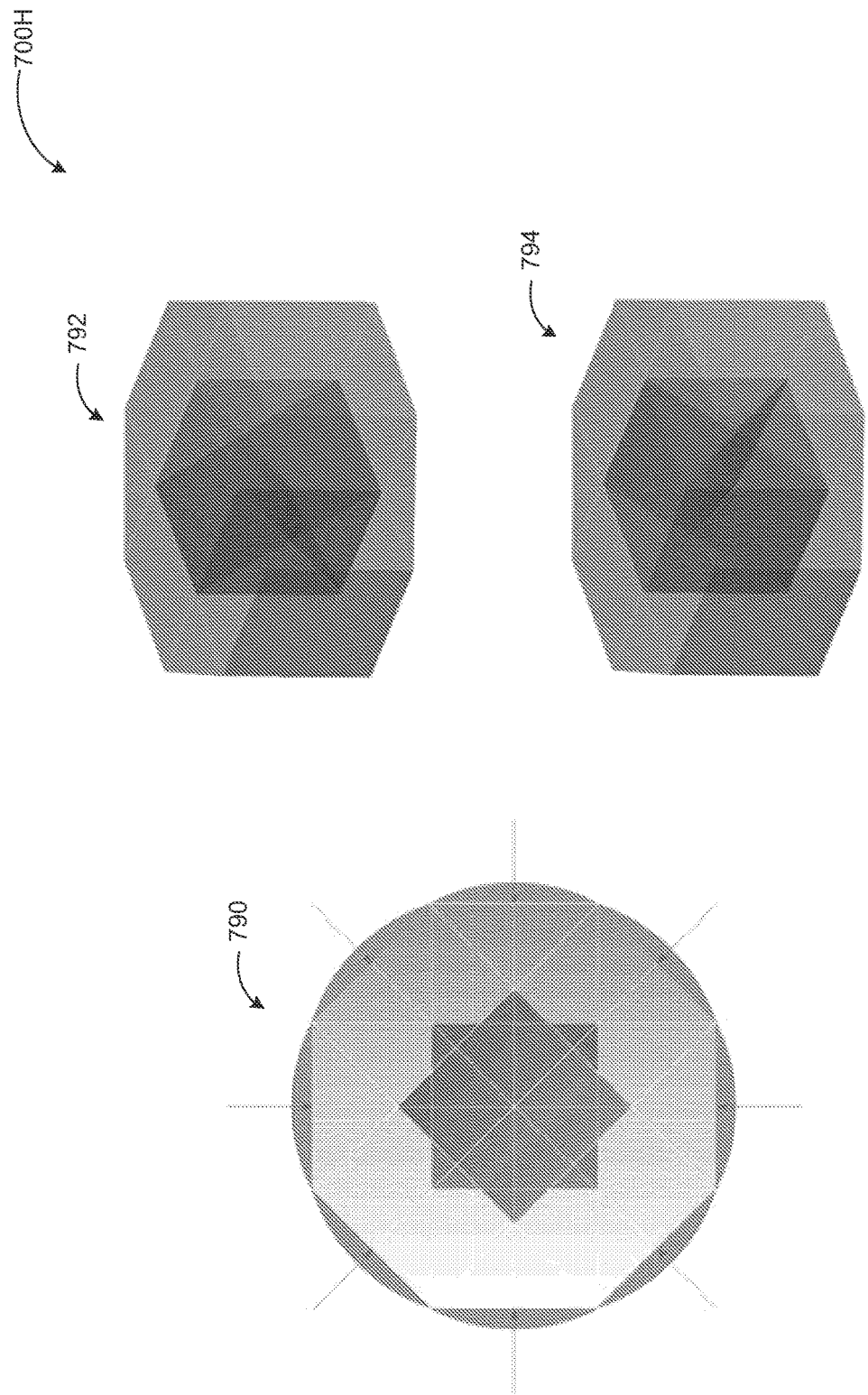

Diagram 700H in FIG. 7H shows an octagonal diversion or image redirection element. Embodiments are not limited to a cubic electro-optical field of view multiplexer, and N-cubes specific to an application may be created by sectioning different polyhedrons. Top view 790 shows an example, where light from eight different directions may be captured and redirected by the redirection element. Three-dimensional views 792 and 794 illustrate how reflection elements internal to the redirection element may be activated and configured to redirect incoming light.

The examples in FIGS. 1A through 7H have been described using specific apparatuses, configurations, and materials to provide an image diversion system. An image diversion system to capture images on a portable electronic device, and employment thereof, is not limited to the specific apparatuses, configurations, and materials according to these examples.

Figure 8:
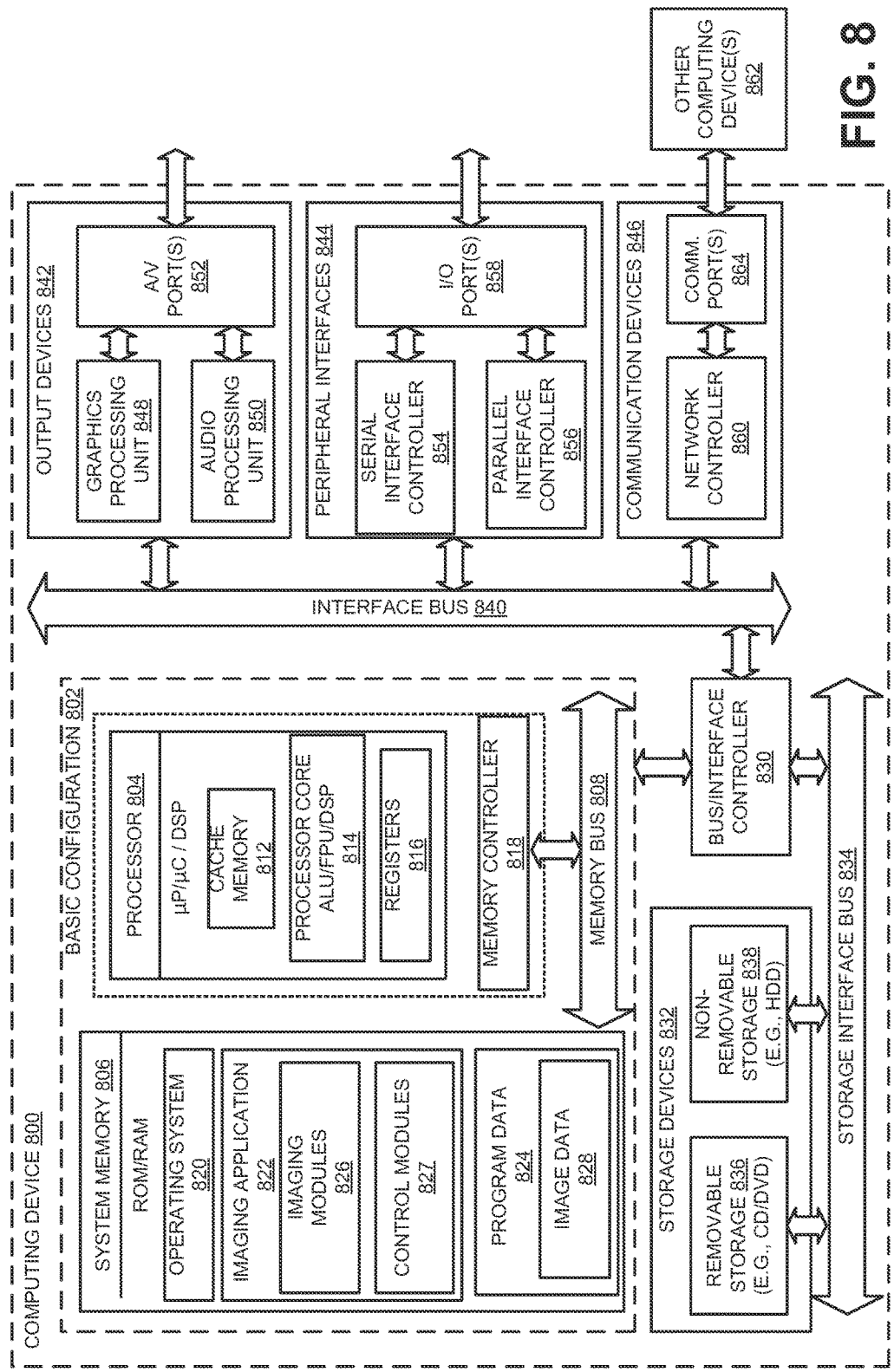
FIG. 8 illustrates a general purpose computing device, which may be used to control an image diversion system.

FIG. 8 illustrates a general purpose computing device, which may be used to control an image diversion system, arranged in accordance with at least some embodiments described herein.

For example, a computing device 800 may be used as a portable computer, smart phone, an electronic camera, a medical monitoring device, a security device, a special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations, the memory controller 818 may be an internal part of the processor 804.

Depending on the desired configuration, the system memory 806 may be of any type including but not limited to volatile memory (such as RAM), non-volatile memory (such as ROM, flash memory, and so on) or any combination thereof. The system memory 806 may include an operating system 820, an imaging application 822, and program data 824. The imaging application 822 may include one or more imaging modules 826 and one or more control modules 827, which may be integral parts of the application or separate applications on their own. The imaging modules 826 may be configured to control various operational aspects of the image sensor used by the computing device 800, process captured images, providing sharing and/or storage of the captured images, and so on. The control modules 827 may be configured to control optical, mechanical, and electrical operational aspects of the image diversion system and any additional elements such as an autofocus element. As such, the control modules 827 may set a direction of a redirection element, control beam splitting interface, tiling of captured images, activation of shutters or similar blocking systems, and so on. The program data 824 may include, among other data, image data 828, such as data related to captured images, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more storage devices 832 via a storage interface bus 834. The storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, stored logic, or other data.

The system memory 806, the removable storage devices 836, and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, and so on.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Example embodiments may also include methods to employ an image diversion system. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
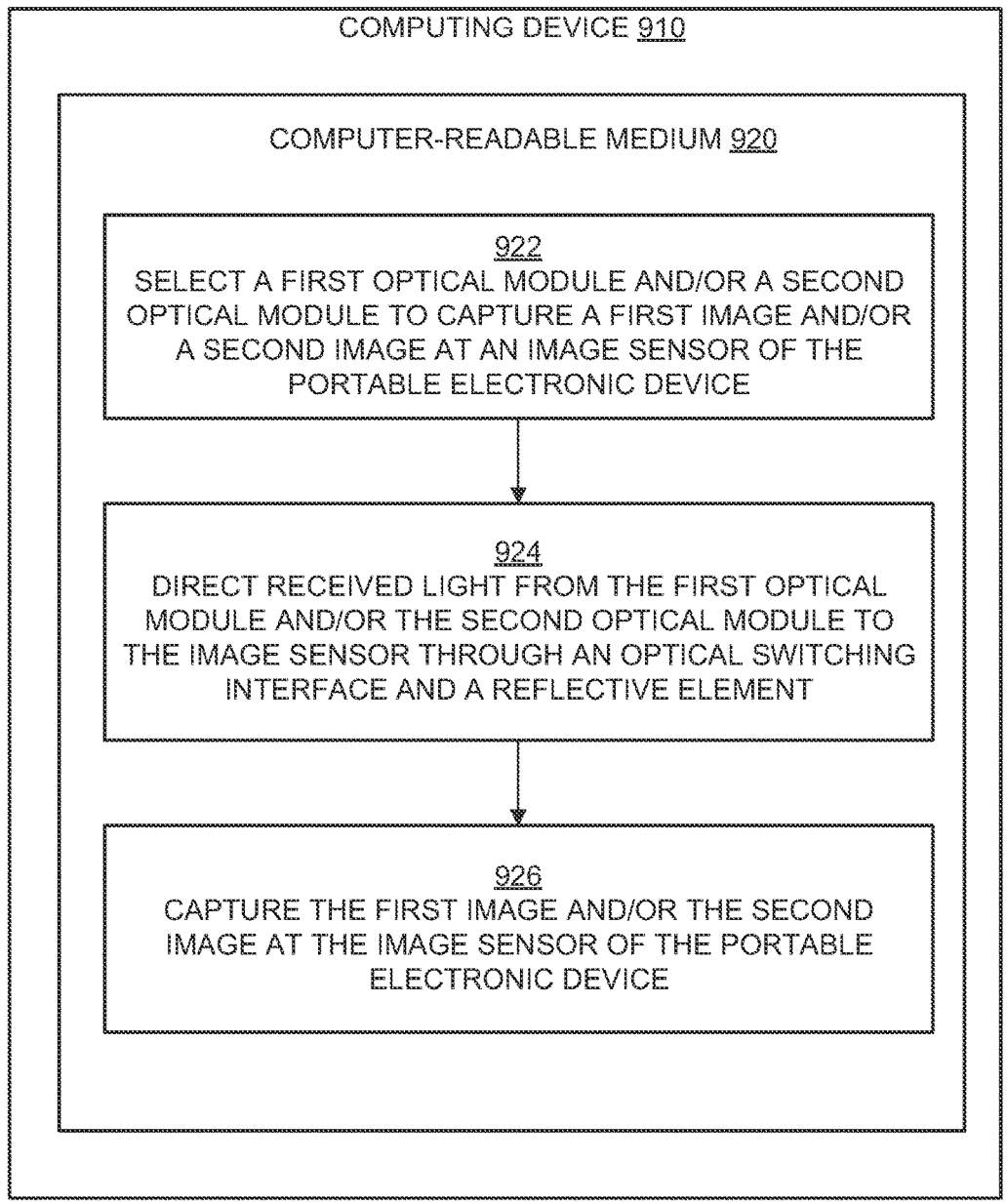
FIG. 9 is a flow diagram illustrating an example process to control an image diversion system that may be performed by a computing device such as the computing device in FIG. 8.

FIG. 9 is a flow diagram illustrating an example process to control an image diversion system that may be performed by a computing device such as the computing device in FIG. 8, arranged in accordance with at least some embodiments described herein.

Example methods may include one or more operations, functions, actions, or logic as illustrated by one or more of blocks 922, 924, and/or 926. The operations described in the blocks 922 through 926 may also be stored as computer-executable instructions in a computer-readable medium such as a computer-readable medium 920 of a computing device 910.

An example process to control an image diversion system may begin with block 922, "SELECT A FIRST OPTICAL MODULE AND/OR A SECOND OPTICAL MODULE TO CAPTURE A FIRST IMAGE AND/OR A SECOND IMAGE AT AN IMAGE SENSOR OF THE PORTABLE ELECTRONIC DEVICE," where one of the control modules 827 may determine (for example, based on user input) from which direction an image is to be captured and select the corresponding optical path (optical module) of the image diversion system. The selection may be implemented by rotating a redirection module, activating an electrically controllable optical interface, etc. While two optical modules are used as an illustrative example, an image diversion system according to embodiments may be implemented with any number of optical modules such as 2, 3, 4, 5, 6, 7, 8, or more. For example, a smart phone capable of capturing images from front and back apertures as well as through two other apertures dedicated to capturing of gesture images may include four optical modules optically coupling those apertures to a single camera.

Block 922 may be followed by block 924, "DIRECT RECEIVED LIGHT FROM THE FIRST OPTICAL MODULE AND/OR THE SECOND OPTICAL MODULE TO THE IMAGE SENSOR THROUGH AN OPTICAL SWITCHING INTERFACE AND A REFLECTIVE ELEMENT," where the image diversion system may direct incoming light through the selected optical path to the image sensor. Additional functionalities such as autofocus or beam splitting may also be performed by controlling various elements of the image diversion system. For example, images captured from two (or more) directions may be tiled through beam splitting.

Block 924 may be followed by block 926, "CAPTURE THE FIRST IMAGE AND/OR THE SECOND IMAGE AT THE IMAGE SENSOR OF THE PORTABLE ELECTRONIC DEVICE," where the image sensor may capture the image (s) provided by the image diversion system.

The blocks included in the above described process are for illustration purposes. Control of an image diversion system for image capture on portable electronic devices may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 10 illustrates a block diagram of an example computer program product, arranged in accordance with at least some embodiments described herein.

In some embodiments, as shown in FIG. 10, the computer program product 1000 may include a signal bearing medium 1002 that may also include one or more machine readable instructions 1004 such as code logic or program logic that, when executed by, for example, a processor, may provide the functionality described herein. Thus, for example, referring to the processor 804 in FIG. 8, a controller module 826 executed on the processor 804 may undertake one or more of the tasks shown in FIG. 10 in response to the instructions 1004 conveyed to the processor 804 by the medium 1002 to perform actions associated with the control of an image diversion system. Some of those instructions may include, for example, one or more instructions to select a first optical module and/or a second optical module to capture a first image and/or a second image at an image sensor of the portable electronic device; direct received light from the first optical module and/or the second optical module to the image sensor through an optical switching interface and a reflective element; capture the first image and/or the second image at the image sensor of the portable electronic device, according to some embodiments described herein.

In some implementations, the signal bearing medium 1002 depicted in FIG. 10 may encompass a computer-readable medium 1006, such as, but not limited to, a hard disk drive, a solid state drive, a Compact Disc (CD), a Digital Versatile Disk (DVD), a digital tape, memory, and so on. In some implementations, the signal bearing medium 1002 may encompass a recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (for example, a fiber optic cable, a waveguide, a wired communications link, a wireless communication link, and so on). Thus, for example, the program product 1000 may be conveyed to one or more modules of the processor 804 of FIG. 8 by an RF signal bearing medium, where the signal bearing medium 1002 is conveyed by the wireless communications medium 1010 (for example, a wireless communications medium conforming with the IEEE 802.11 standard).

According to some examples, an electronic device configured to capture images from different directions may be described. An example electronic device may include an image sensor and an image diversion sub-system, which may include a first optical module, the first optical module configured to allow the image sensor to capture a first image from a first direction; a second optical module, the second optical module configured to allow the image sensor to capture a second image from a second direction; and an optical switching interface configured to optically couple one or both of the first optical module and the second optical module to the image sensor.

According to other examples, the first direction may be opposite to the second direction. The image sensor may include an image sensor plane and the first direction may be perpendicular to the image sensor plane. The electronic device may be one of a communication device, an image capture device, a wearable device, a medical device, a security monitor, and a surveillance device. The optical switching interface may include an electro-optical field of view multiplexer, where the electro-optical field of view multiplexer may be configured to control the direction of the light entering the image diversion sub-system. The electro-optical field of view multiplexer may be configured to control the direction of the light entering the image diversion sub-system through activation of alternate faces of the electro-optical field of view multiplexer by one or more of electrochromic mirrors, electrically switchable trans-reflective mirrors, or electro-optic polymers.

According to further examples, the electro-optical field of view multiplexer may include a first electrically selectable electro-optical film, that when electrically selected optically couples the first optical module to the image sensor; and a second electrically selectable electro-optical film, that when electrically selected optically couples the second optical module to the image sensor. The first electrically selectable electro-optical film may include a first electrochromic mirror, and the second electrically selectable electro-optical film may include a second electrochromic mirror. The electronic device may include a third optical module, the third optical module configured to allow the image sensor to capture a third image from a third direction.

According to yet other examples, the electronic device may include a fourth optical module, the fourth optical module configured to allow the image sensor to capture a fourth image from a fourth direction. The first, second, third, and fourth direction may be all at right angles to each other. The optical switching interface may include an electro-optical field of view multiplexer, where the electro-optical field of view multiplexer includes a first electrically selectable electro-optical film, that when electrically selected optically couples the first optical module to the image sensor; and a second electrically selectable electro-optical film, that when electrically selected optically couples the second optical module to the image sensor, a third electrically selectable electro-optical film, that when electrically selected optically couples the third optical module to the image sensor; and a fourth electrically selectable electro-optical film, that when electrically selected optically couples the fourth optical module to the image sensor.

According to some examples, the electronic device may further include a fifth optical module, the fifth optical module configured to allow the image sensor to capture a fifth image from a fifth direction. The electronic device may further include a sixth optical module, the sixth optical module configured to allow the image sensor to capture a sixth image from a sixth direction. The first optical module may include a first lens, and the second optical module may include a second lens. The electronic device may include a housing that includes a first face, the first face comprising an electronic display and a first lens supported by the housing; a second face, spaced apart from the first face, the second face including a second lens supported by the housing; and an edge region disposed around the periphery of the housing and extending between the first face and the second face, where the first optical module may include the first lens and the second optical module may include the second lens.

According to other examples, the image sensor plane may be parallel to the first face. The electronic device further may include an electronic circuit configured to receive sensor data from the image sensor and provide a display signal to the electronic display. The electronic circuit may include a processor, a clock, and a memory. The first optical module and the second optical module each may include one or more optical elements selected from a group of optical elements consisting of lenses, windows, prisms, polarizers, reflectors, optical filters, partial reflectors, and autofocus elements. The first direction and the second direction may be variable directions such that the first image and the second image provide one of dual, quadrilateral, hemispherical, or spherical views based on the first direction and the second direction.

The first optical module and the second optical module may be configured such that an optical alignment axis of the first optical module may be offset relative to an optical alignment axis of the second module. At least one of the first plurality of optical elements and the second plurality of optical elements may include an auto-focus element, stabilization element, or similar assembly. The electronic device may further include an auto-focus element located between the optical switching interface and the image sensor. The auto-focus element may include an electrically-focusable lens or a liquid lens. The optical switching interface may be configured to provide light from one of the first optical module and the second optical module to the image sensor.

According to further examples, the optical switching interface may include a reflective element to direct the light from the one of the first optical module and the second optical module to the image sensor. The optical switching interface may also include a beam splitter configured to allow light from the first optical module and the second optical module to be provided to the image sensor simultaneously such that a portion of the first image and a portion of the second image may be tiled or superimposed at the image sensor. The image diversion sub-system further may include a third optical module, the third optical module configured to allow the image sensor to capture a third image from a third direction, where the interface module may be further configured to optically couple the third optical module to the image sensor. The third direction may be substantially parallel to and offset from the first direction or the second direction.

According to yet other examples, the optical switching interface may be configured to rotate, where rotation of the optical switching interface rotates the both first direction and the second direction relative to the image sensor plane. The electronic device may further include a rotatable enclosure configured to house the first optical module or the second optical module. The rotatable enclosure may be rotatable manually or automatically. The electronic device may further include an electro-optical actuator configured to electronically control a direction of the rotatable enclosure and of light entering the image diversion sub-system. The electronic device may further include a conical element configured to extend above an exterior element of at least one of the first optical module or the second optical module to allow capture of panoramic images. The electronic device may further include one or more of a light blocking filter and a shutter to reduce light leakage. The first optical module may include one or more optical materials from a group of optical materials consisting of glass, acrylic, liquid crystal, optical polymers, inorganic optical materials such as sapphire, or be holographically constructed. An exterior element of at least one of the first optical module or the second optical module may be configured to be integrated into a cover slip of the electronic device. The first and/or second optical module may include a fisheye lens.

According to other examples, a smart phone capable of capturing images from different directions is described. The smart phone may include a housing; at least one communication sub-system within the housing; at least one processing sub-system within the housing; at least one camera within the housing, the at least one camera coupled to the at least one processing sub-system; and at least one image diversion sub-system within the housing, the at least one image diversion sub-system coupled to the at least one camera. The at least one image diversion sub-system may include a first optical module comprising a first plurality of optical elements, the first optical module configured to allow the at least one camera to capture a first image from a rear direction of the smart phone; a second optical module comprising a second plurality of optical elements, the second optical module configured to allow the at least one camera to capture a second image from a front direction of the smart phone; and at least one optical switching interface configured to optically couple the first optical module and the second optical module to the at least one camera.

According to some examples, the first optical module and the second optical module may be configured such that an optical alignment axis of the first optical module may be offset relative to an optical alignment axis of the second optical module. At least one of the first plurality of optical elements and the second plurality of optical elements may include an auto-focus or stabilization element. The smart phone may further include a rotatable enclosure configured to house the first optical module or the second optical module. The at least one optical switching interface may further include a beam splitter configured to allow light from the first optical module and the second optical module to be provided to the at least one camera simultaneously such that a portion of the first image and a portion of the second image may be tiled or superimposed at the at least one camera.

According to further examples, the at least one optical switching interface may further include an electro-optical field of view multiplexer coupled to the first optical module and the second optical module, where the electro-optical field of view multiplexer may be configured to control a direction of light entering the at least one image diversion sub-system. The smart phone may further include a conical element configured to extend above an exterior element of at least one of the first optical module or the second optical module to allow capture of panoramic images. The smart phone may further include one of a light blocking filter and a shutter to reduce light leakage.

According to further examples, a method to use an image diversion system within an electronic device is described. The method may include selecting one of a first optical module and a second optical module to capture one of a first image and a second image at an image sensor of the electronic device, where the first optical module may be configured to allow the image sensor to capture the first image from a first direction, the second optical module may be configured to allow the image sensor to capture the second image from a second direction, and an optical switching interface configured to optically couple one or both of the first optical module and the second optical module to the image sensor; and capturing the one of the first image and the second image at the image sensor of the electronic device.

According to some examples, the method may further include prior to capturing the one of the first image and the second image, adjusting an auto-focus element located between the optical switching interface and the image sensor. The method may further include directing received light from one of the first optical module and the second optical module to the image sensor through the optical switching interface, where the optical switching interface includes a reflective element. The method may further include directing received light from the first optical module and the second optical module to the image sensor simultaneously through the optical switching interface, where the optical switching interface may be a beam splitter such that a portion of the first image and a portion of the second image may be tiled or superimposed at the image sensor.

According to other examples, the method may further include allowing one of the first direction and the second direction to be modified through a rotatable enclosure configured to house the first optical module or the second optical module. The optical switching interface may be an electro-optical field of view multiplexer and, selecting one of the first optical module and the second optical module may include activating alternate faces of the electro-optical field of view multiplexer coupled to the first optical module and the second optical module by one or more of electrochromic mirrors, electrically switchable trans-reflective mirrors, liquid crystals, or electro-optic polymers. The method may further include allowing capture of panoramic images through a conical element configured to extend beyond an exterior element of at least one of the first optical module or the second optical module. The method may further include reducing light leakage through one of a light blocking filter and a shutter.

According to yet other examples, a method to assemble an image diversion system is described. The method may include coupling a first optical module to an optical switching interface, where the first optical module may include a first plurality of optical elements and may be configured to allow an image sensor to capture a first image from a first direction; coupling a second optical module to the optical switching interface, where the second optical module may include a second plurality of optical elements and may be configured to allow the image sensor to capture a second image from a second direction; and where the first plurality of optical elements may include a first series of aligned lenses, polarizers, optical filters, or partial reflectors and the second plurality of optical elements may include a second series of aligned lenses, polarizers, optical filters, or partial reflectors, and the first series and the second series may include a similar arrangement of optical elements.

According to some examples, coupling the first optical module and the second optical module to the optical switching interface may include coupling the first optical module and the second optical module to the optical switching interface such that an optical alignment axis of the first optical module may be offset relative to an optical alignment axis of the second optical module. The method may further include integrating an auto-focus or stabilization element among at least one of the first plurality of optical elements and the second plurality of optical elements. The optical switching interface may be configured to provide light from one of the first optical module and the second optical module to the image sensor. The optical switching interface may include a reflective element to direct the light from the one of the first optical module and the second optical module to the image sensor.

According to other examples, the optical switching interface may be a beam splitter configured to allow light from the first optical module and the second optical module to be provided to the at least one image sensor simultaneously such that a portion of the first image and a portion of the second image may be tiled or superimposed at the at least one image sensor. The method may further include prior to coupling the first optical module and the second optical module to the optical switching interface, integrating the first optical module or the second optical module in a rotatable enclosure configured to modify one or both of the first direction and the second direction. The optical switching interface may be an electro-optical field of view multiplexer configured to control a direction of light entering the image diversion system. The method may further include coupling a conical element to the first optical module or the second optical module, the conical element configured to extend above an exterior element of at least one of the first optical module or the second optical module to allow capture of panoramic images.

According to some examples, an image diversion system is described. An example system may include a first optical module comprising a first plurality of optical elements, the first optical module configured to allow at least one image sensor to capture a first image from a first direction; a second optical module comprising a second plurality of optical elements, the second optical module configured to allow the at least one image sensor to capture a second image from a second direction; and at least one optical switching interface configured to optically couple one or both of the first optical module and the second optical module to the at least one image sensor.

According to further examples, the first plurality of optical elements may include a first series of aligned lenses, polarizers, optical filters, or partial reflectors and the second plurality of optical elements may include a second series of aligned lenses, polarizers, optical filters, or partial reflectors. The first series and the second series may include a similar arrangement of optical elements. The first direction and the second direction may be variable directions such that the first image and the second image provide one of dual, quadrilateral, hemispherical, or spherical views based on the first direction and the second direction. Lenses of the first series and the second series may be fish-eye lenses to achieve the hemispherical or spherical views.

According to yet other examples, the first optical module and the second optical module may be configured such that an optical alignment axis of the first optical module may be offset relative to an optical alignment axis of the second optical module. At least one of the first plurality of optical elements and the second plurality of optical elements may include an auto-focus or stabilization element. The optical switching interface may be configured to provide light from one of the first optical module and the second optical module to the at least one image sensor. The optical switching interface may include a reflective element configured to direct the light from the one of the first optical module and the second optical module to the at least one image sensor.

According to some examples, the optical switching interface may include a beam splitter configured to allow light from the first optical module and the second optical module to be provided to the at least one image sensor simultaneously such that a portion of the first image and a portion of the second image may be tiled or superimposed at the at least one image sensor. The beam splitter may be a reflective surface that covers about half of a surface of the optical switching interface. The optical switching interface may include an electro-optical field of view multiplexer coupled to the first optical module and the second optical module, where the electro-optical field of view multiplexer may be configured to control a direction of light entering the image diversion system. The electro-optical field of view multiplexer may be configured to control the direction of the light entering the image diversion system through activation of alternate faces of the electro-optical field of view multiplexer by one or more of electrochromic mirrors, electrically switchable trans-reflective mirrors, or electro-optic polymers.

According to some examples, the electro-optical field of view multiplexer may be configured in a plane of the first optical module and the second optical module. The electro-optical field of view multiplexer may be configured 45 degrees out of a plane of the first optical module and the second optical module. The electro-optical field of view multiplexer may be configured to be stackable with one or more other electro-optical field of view multiplexers. The system may further comprise a third optical module comprising a third plurality of optical elements, the third optical module configured to allow the at least one image sensor to capture a third image from a third direction, where the at least one interface module may be further configured to optically couple the third optical module to the at least one image sensor. The system may further include a rotatable enclosure configured to house the first optical module or the second optical module. The rotatable enclosure may be rotatable manually or automatically. The system may further include an electro-optical actuator configured to electronically control a direction of the rotatable enclosure and of light entering the image diversion system.

According to other examples, the system may further include a conical element configured to extend above an exterior element of at least one of the first optical module or the second optical module to allow capture of panoramic images. The system may further include one of a light blocking filter and a shutter to reduce light leakage. The first plurality of optical elements and the second plurality of optical elements may be formed by an optical material selected from a group of optical materials consisting of glasses, optical polymers, and liquid crystals. An exterior element of at least one of the first optical module or the second optical module may be configured to be integrated into a cover slip of an electronic device comprising the image diversion system. The image diversion system may be configured to be integrated into a communication device, an image capture device, a wearable device, a medical device, or a surveillance device.

EXAMPLES

Following are illustrative examples of how some embodiments may be implemented, and are not intended to limit the scope of embodiments in any way.

Example 1: Smart Phone with Integrated Image Diversion System

Given the highly competitive and price-sensitive market of smart phones, a manufacturer wants to gain competitive edge by designing thin form-factor smart phones with low cost, but same functionality as similar phones in the market. One of the major cost contributors are dual cameras in the phone. Consumers expect front and back cameras for self-portraits. Two distinct cameras add to cost of goods. The cameras also mean additional power requirement, extra space on circuit boards, more complex logic, additional integrated circuits, and heat mitigation concerns, all of which are exacerbated when the form factor is an even thinner design.

The smart phone manufacturer opts for a single camera and an image diversion system. Due to layout constraints, the optical apertures cannot be aligned between the front and rear faces of the phone. The image diversion system is selected to provide offset coupling to the front and rear optical apertures. An electro-optical field of view multiplexer is used. The interface to select between the two optical apertures is an electro-optically actuated semi-reflective surface.

A camera control app on the smart phone controls the interface. The rear optical aperture is the default path for the camera. If the user selects the front aperture, the interface is activated and light from the rear optical aperture is directed to the camera of the phone. The manufacturer is able to reduce the cost of goods by 10% through the removal of the second camera and associated circuitry, as well as reduced power requirements (thereby, smaller capacity battery or longer operation time with existing battery). With the folded design of the image diversion system, the imaging circuitry fit to the thin form factor design. The phone becomes a hit in the market.

Example 2: Bidirectional Camera Capability for Skiers

A manufacturer designs ski goggles with a wireless camera to allow skiers capture still images or video of the scenery around them as they ski. The camera is designed to transmit captured images video to a storage device connected to the camera via near-field communication (NFC). Because size, weight, cost, and reliability are major design parameters, a single camera is designed into the goggles facing front.

In a second model of the goggles, the manufacturer implements an offset image diversion system with a rotatable prism-based redirection element. One aperture of the system faces toward the rear of the wearer such that images of the scenery behind the skier can be captured. Images can be displayed in real time on an integrated display incorporated into the goggles to avoid collisions from the rear. The front-facing aperture is attached to the prism redirection element, which is manually rotatable. Thus, the wearer can adjust an angle of the front aperture and capture images of the scenery directly in front of him or at a slight angle.

The image diversion system includes a removable filter insert to allow wearers use various filters depending on light conditions or use of the camera at night. Both optical apertures are also fitted with shutters to allow reduction of light under extremely bright conditions. The manually rotatable prism redirection element provides reliability for an implementation that is expected to see high amount of wear and tear. Use of single camera provides longer use per battery and less complexity in circuitry.

Example 3: Conference System Module for Computers Having Front-Facing Webcams

Many computers (laptop, tablet) come with a front-facing camera to allow users take advantage of web-based communication applications for video conferencing, for example. However, true video conferencing systems that allow multiple people in the same room to have an online meeting with another group at a different location are usually expensive services.

A start-up company offers a conferencing module that includes a small form-factor camera extender and software to control the system. The camera extender fits over the existing front-facing camera and includes an offset image diversion system that allows images to be captured from a rear-facing direction (back of the computer's display) as well as a top-facing direction. The top facing optical aperture is fitted with a conical element to allow capture of panoramic images around the room. The rear facing aperture allows capture of video of a person sitting across from the user of the computer or a whiteboard across from the user.

The image diversion system includes an electronically controlled beam splitter interface. Thus, the user can select through the software if they want the front-facing view, rear-facing view, split view (front and back), or the panoramic view. An electronic autofocus feature provides crisp images when in the rear-facing view mode. Because the camera extender product does not include any cameras, it can be manufactured and marketed competitively priced. Due to its small form-factor and relatively simpler design, it can be marketed in various forms for various computers.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

In some examples, an image diversion system comprises: a first optical module comprising a first plurality of optical elements, the first optical module configured to allow at least one image sensor to capture a first image from a first direction; a second optical module comprising a second plurality of optical elements, the second optical module configured to allow the at least one image sensor to capture a second image from a second direction; an image sensor; and an interface module configured to optically couple one or both of the first optical module and the second optical module to the image sensor. In some examples, the interface module may comprise a beam splitter configured to allow light from the first optical module and the second optical module to be provided to the image sensor essentially simultaneously (for example, sequentially alternating between light from the first and second directions), such that a portion of the first image and a portion of the second image are tiled or superimposed at the image sensor. In some embodiments, the interface module may be configured to allow light from both the first optical module and the second optical module to reach the image sensor, and optical shutters, for example within each of the first and second optical module, or within the interface module, may be configured to allow selection of which of the first and second optical modules provides light to the image sensor. In some examples, the image sensor may receive light from the first optical module for a first time, and receive light from the second optical module for a second time, allowing respective first and second images to be collected for each of first and second directions. Image processing may then be used to provide a single image including features from both the first and second image, for example a tiled image, and for example a smaller image of the user may be placed (for example, tiled) within a larger image of what the user was observing at essentially the same time (or vice versa). Similarly, in some examples the device may be configured to provide a video that shows both the user and a scene observable by the user at substantially or essentially the same time. In some examples, light from first and second directions may be polarized in orthogonal directions (or spectrally filtered in a predetermined manner), allowing the source direction of the light to be determined at an image sensor having polarization-sensitive (or spectrally sensitive) elements. In some examples, apparatus and methods described herein may be configured for use with optical instruments, such as telescopes, microscopes, cameras (such as security cameras, and including video cameras), and any optical sensor system, and apparatus configured to use such sensors, such as vehicles, surveillance equipment, satellites, and the like. In some examples, the image sensor may be essentially a visible electromagnetic radiation image sensor. In some examples the image sensor may be sensitive to one or more spectral ranges, such as IR, near-IR, visible, near-UV, or UV radiation. In some examples, different image sensors of two or more image sensors may have different spectral sensitivities. Optical modules may include IR, visible, and/or UV optics and/or sensors, as appropriate. In some examples, an optical module may include one or more spectrally dispersive elements, such as a prism, a grating, and the like, allowing spectral analysis of light from one or more directions. In some examples, only first and second optical modules may be used, and in some examples additional optical modules may be used, and in some examples a suitably configured interface module may allow images to be formed using light from two or more directions, such as 3, 4, 5, 6, or more directions, in some examples essentially simultaneously. In some examples, different directions may differ in angles within a first plane, in some examples different directions may differ in azimuth angle measured in an orthogonal plane to the first plane, in some examples different directions may be laterally offset from each other (for example, for 3D image formation and the like), and in some examples different directions may differ in some combination of angle, orthogonal azimuth angle, and spatial position from which the direction is effectively determined from (for example, for multi-aperture optical systems.) In some examples, an image diversion system may be configured to provide an image or video representing the entire sphere of directions generally centered on a user or apparatus including the image diversion system, or a portion of the sphere.

In some examples, a light projector (such as an LED array, any lamp(s), or any emissive display or portion thereof) may be provided in place of or in addition to the image sensor, allowing a projected image to be formed in first and/or second directions using the optical modules.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, and so on; and a transmission type medium such as a digital and/or an analog communication medium (for example, a fiber optic cable, a waveguide, a wired communications link, a wireless communication link, and so on).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, and so on" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

The invention claimed is:

1. An electronic device configured to capture images from different directions, the electronic device comprising:
   an image sensor;
   a set of imaging lenses; and
   an image diversion sub-system, comprising:
      a first optical aperture, the first optical aperture configured to allow the image sensor to capture a first image from a first direction;
      a second optical aperture, the second optical aperture configured to allow the image sensor to capture a second image from a second direction; and
      an optical switching interface comprising an electro-optical field of view multiplexer configured to control a direction of electromagnetic radiation entering the image diversion sub-system and configured to optically couple one or both of the first optical aperture and the second optical aperture to the image sensor through the set of imaging lenses, the set of imaging lenses located after the optical switching interface in an optical path between the image sensor and the image diversion sub-system,
      wherein the electro-optical field of view multiplexer comprises:
         a first electrically selectable electro-optical film that, when electrically selected, optically couples the first optical aperture to the image sensor; and
         a second electrically selectable electro-optical film that, when electrically selected, optically couples the second optical aperture to the image sensor.

2. The electronic device of claim 1 wherein the first direction is opposite to the second direction.

3. The electronic device of claim 1 wherein the image sensor has an image sensor plane, and wherein the first direction is perpendicular to the image sensor plane.

4. The electronic device of claim 1 wherein the electronic device is one of a communication device, a phone, an image, video, or virtual reality capture device, a wearable device, a medical device, a monitoring system, a security device, and a surveillance device.

5. The electronic device of claim 1 wherein the electro-optical field of view multiplexer is configured to control the direction of the electromagnetic radiation entering the image diversion sub-system through activation of alternate faces of the electro-optical field of view multiplexer by one or more of electrochromic mirrors, electrically switchable trans-reflective mirrors, liquid crystals, or electro-optic polymers.

6. The electronic device of claim 1, further comprising:
   a third optical aperture, the third optical aperture configured to allow the image sensor to capture a third image from a third direction.

7. The electronic device of claim 6 wherein the first, second, and third direction are all at right angles to each other.

8. The electronic device of claim 1 wherein the electronic device has a housing comprising:
   a first face, the first face comprising an electronic display and a first lens supported by the housing;
   a second face, spaced apart from the first face, the second face including a second lens supported by the housing; and
   an edge region disposed around the periphery of the housing and extending between the first face and the second face, wherein
   the first optical aperture is optically coupled to a first lens;
   the second optical aperture is optically coupled to a second lens.

9. The electronic device of claim 1 wherein the first direction and the second direction are variable directions such that the first image and the second image provide one of dual, quadrilateral, hemispherical, or spherical views based on the first direction and the second direction.

10. The electronic device of claim 1 wherein the image sensor is mounted parallel to a housing of the electronic device.

11. The electronic device of claim 1 wherein
   the first electrically selectable electro-optical film comprises a first electrochromic mirror, and
   the second electrically selectable electro-optical film comprises a second electrochromic mirror.

12. The electronic device of claim 1, further comprising:
   an additional optical element configured between the optical switching interface and the image sensor, comprising one or more of: auto-focus element, a stabilization element, a liquid lens, an optical filter, and/or a polarizer.

13. The electronic device of claim 1 wherein the optical switching interface comprises:
   a beam splitter configured to allow light from the first optical aperture and the second optical aperture to be provided to the image sensor simultaneously such that a portion of the first image and a portion of the second image are tiled or superimposed at the image sensor.

14. The electronic device of claim 1, further comprising:
   a rotatable enclosure configured to house the first optical aperture and/or the second optical module.

15. The electronic device of claim 14, further comprising:
an electro-optical actuator configured to electronically control a direction of the rotatable enclosure and of light entering the image diversion sub-system.

16. The electronic device of claim 1, further comprising:
a conical element configured to extend above an exterior element of at least one of the first optical aperture or the second optical aperture to allow capture of panoramic images.

17. A method to use an image diversion system within an electronic device, the method comprising:
selecting one of a first optical aperture and a second optical aperture to capture one of a first image and a second image at an image sensor of the electronic device, wherein
the first optical aperture is configured to allow the image sensor to capture the first image from a first direction,
the second optical aperture is configured to allow the image sensor to capture the second image from a second direction, and
an optical switching interface comprising an electro-optical field of view multiplexer configured to control a direction of electromagnetic radiation entering the image diversion sub-system and configured to optically couple one or both of the first optical aperture and the second optical aperture to the image sensor through a set of imaging lenses located after the optical switching interface in an optical path between the image sensor and the optical switching interface; wherein the electro-optical field of view multiplexer comprises:
a first electrically selectable electro-optical film that, when electrically selected, optically couples the first optical aperture to the image sensor; and
a second electrically selectable electro-optical film that, when electrically selected, optically couples the second optical aperture to the image sensor; and
capturing the one of the first image and the second image at the image sensor of the electronic device using the optical switching interface and the set of imaging lenses.

18. The method of claim 17, further comprising:
prior to capturing the one of the first image and the second image, adjusting an auto-focus element located between the optical switching interface and the image sensor.

19. The method of claim 17, further comprising:
allowing one of the first direction and the second direction to be modified through a rotatable enclosure configured to house the first optical aperture and/or the second optical aperture.

20. The method of claim 17, wherein the selecting one of the first optical aperture and the second optical aperture comprises:
activating alternate faces of the electro-optical field of view multiplexer coupled to the first optical aperture and the second optical aperture by one or more of electrochromic mirrors, electrically switchable trans-reflective mirrors, or electro-optic polymers.

21. The method of claim 17, further comprising:
allowing capture of panoramic images through a conical element configured to extend beyond an exterior element of at least one of the first optical aperture or the second optical aperture.

22. The method of claim 17, further comprising:
reducing light leakage through one or more of a light blocking filter and a shutter.

23. The method of claim 17, wherein the first direction and the second direction are variable directions such that the first image and the second image provide one of dual, quadrilateral, hemispherical, or spherical views based on the first direction and the second direction.

24. An electronic device configured to capture images from different directions, the electronic device comprising:
an image sensor mounted parallel to a housing of the electronic device;
a set of imaging lenses; and
an image diversion sub-system, comprising:
a first optical aperture, the first optical aperture configured to allow the image sensor to capture a first image from a first direction;
a second optical aperture, the second optical aperture configured to allow the image sensor to capture a second image from a second direction; and
an optical switching interface comprising an electro-optical field of view multiplexer configured to control a direction of electromagnetic radiation entering the image diversion sub-system and configured to optically couple one or both of the first optical aperture and the second optical aperture to the image sensor through the set of imaging lenses, the set of imaging lenses located after the optical switching interface in an optical path between the image sensor and the image diversion sub-system; and
an additional redirection element positioned between the set of imaging lenses and the image sensor and configured to redirect light from the set of imaging lenses to the image sensor.

* * * * *